US012764560B2

(12) United States Patent
Kim et al.

(10) Patent No.: US 12,764,560 B2
(45) Date of Patent: Oct. 13, 2026

(54) METHOD AND DEVICE FOR TRANSMISSION AND RECEPTION BASED ON DEFAULT SPATIAL PARAMETER IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 857 days.

(21) Appl. No.: 18/009,706

(22) PCT Filed: Jul. 14, 2021

(86) PCT No.: PCT/KR2021/009063
§ 371 (c)(1),
(2) Date: Dec. 9, 2022

(87) PCT Pub. No.: WO2022/015061
PCT Pub. Date: Jan. 20, 2022

(65) Prior Publication Data

US 2023/0224726 A1 Jul. 13, 2023

(30) Foreign Application Priority Data

Jul. 15, 2020 (KR) ........................ 10-2020-0087825
Jan. 19, 2021 (KR) ........................ 10-2021-0007149
Jun. 25, 2021 (KR) ........................ 10-2021-0083095

(51) Int. Cl.
*H04W 16/28* (2009.01)
*H04W 72/1273* (2023.01)
*H04W 72/23* (2023.01)

(52) U.S. Cl.
CPC ....... *H04W 16/28* (2013.01); *H04W 72/1273* (2013.01); *H04W 72/23* (2023.01)

(58) Field of Classification Search
CPC . H04W 16/28; H04W 72/1273; H04W 72/23; H04W 72/231; H04W 72/0446;
(Continued)

(56) References Cited

U.S. PATENT DOCUMENTS

2019/0342907 A1 11/2019 Huang et al.
2020/0204236 A1 6/2020 Zhou et al.
(Continued)

OTHER PUBLICATIONS

CMCC, "Remaining issues on multi-TRP/panel transmission," 3GPP TSG-RAN WG1 #100bis, R1-2002212, Apr. 2020,7 pages.
(Continued)

*Primary Examiner* — Rownak Islam
(74) *Attorney, Agent, or Firm* — LEE, HONG, DEGERMAN, KANG & WAIMEY

(57) ABSTRACT

Disclosed are a method and device for transmission or reception based on a default spatial parameter in a wireless communication system, which may include receiving from the base station configuration information for at least one of a spatial parameter configured for at least one codepoint or a spatial parameter configured for a control resource set (CORESET); receiving downlink control information (DCI) from the base station in a first time unit; and receiving downlink transmission from the base station based on at least one default spatial parameter in a second time unit, and based on the at least one codepoint not including a codepoint that a plurality of spatial parameters are configured, the at least one default spatial parameter may be determined based on at least one of a plurality of spatial parameters configured for the CORESET.

9 Claims, 12 Drawing Sheets

(58) Field of Classification Search
CPC .......................... H04W 72/046; H04W 72/232; H04L 5/0023; H04L 5/005; H04L 5/0035; H04L 5/0053; H04L 5/0094; H04L 5/0048; H04L 27/26025; H04B 7/06968; H04B 7/024; Y02D 30/70
USPC .......................................................... 370/329
See application file for complete search history.

(56) References Cited

U.S. PATENT DOCUMENTS

| | | | | |
|---|---|---|---|---|
| 2022/0312467 | A1* | 9/2022 | Matsumura | H04L 5/0023 |
| 2022/0408470 | A1* | 12/2022 | Jung | H04B 7/06968 |
| 2023/0106244 | A1* | 4/2023 | Yu | H04L 5/0048 370/329 |
| 2023/0209569 | A1* | 6/2023 | Matsumura | H04B 7/0695 370/329 |

OTHER PUBLICATIONS

Lenovo, Motorola Mobility, "Remaining issues on multi-TRP/panel transmission," 3GPP TSG-RAN WG1 Meeting #101, e-Meeting, R1-2003819, May 2020, 14 pages.

Samsung, "On Rel. 16 multi-TRP/panel transmission," 3GPP TSG-RAN WG1 Meeting #101-e, e-Meeting, R1-2003881, May 2020, 15 pages.

ZTE, "Maintenance of multi-TRP enhancements," 3GPP TSG-RAN WG1 Meeting #101-e, e-Meeting, R1-2003469, May 2020, 10 pages.

PCT International Application No. PCT/KR2021/009063, Written Opinion of the International Searching Authority dated Oct. 29, 2021, 4 pages.

Korean Intellectual Property Office Application Serial No. 10-2022-7032978, Office Action dated Oct. 21, 2022, 4 pages.

* cited by examiner

METHOD AND DEVICE FOR TRANSMISSION AND RECEPTION BASED ON DEFAULT SPATIAL PARAMETER IN WIRELESS COMMUNICATION SYSTEM

CROSS-REFERENCE TO RELATED APPLICATION(S)

This application is the National Stage filing under 35 U.S.C. 371 of International Application No. PCT/KR2021/009063, filed on Jul. 14, 2021, which claims the benefit of earlier filing date and right of priority to Korean Application Nos. 10-2020-0087825, filed on Jul. 15, 2020, 10-2021-0007149, filed on Jan. 19, 2021, and 10-2021-0083095, filed on Jun. 25, 2021, the contents of which are all incorporated by reference herein in their entirety.

TECHNICAL FIELD

The present disclosure relates to a wireless communication system, and in more detail, relates to a transmission and reception method and device based on a default spatial parameter in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a transmission and reception method and device based on a plurality of default spatial parameters for a predetermined time duration in a wireless communication system.

An additional technical problem of the present disclosure is to provide a transmission and reception method and device based on a plurality of default spatial parameters based on at least one of a spatial parameter configured for a predetermined codepoint or a spatial parameter configured for a control resource set in a wireless communication system. The technical objects to be achieved by the present disclosure are not limited to the above-described technical objects, and other technical objects which are not described herein will be clearly understood by those skilled in the pertinent art from the following description.

A method of receiving downlink transmission from a base station by a terminal in a wireless communication system according to an aspect of the present disclosure: includes receiving from the base station configuration information for at least one of a spatial parameter configured for at least one codepoint or a spatial parameter configured for a control resource set (CORESET); receiving downlink control information (DCI) from the base station in a first time unit; and receiving downlink transmission from the base station based on at least one default spatial parameter in a second time unit, and based on the at least one codepoint not including a codepoint that a plurality of spatial parameters are configured, the at least one default spatial parameter may be determined based on at least one of a plurality of spatial parameters configured for the CORESET.

A method of performing downlink transmission by a base station in a wireless communication system according to an additional aspect of the present disclosure: includes transmitting to a terminal configuration information for at least one of a spatial parameter configured for at least one codepoint or a spatial parameter configured for a control resource set (CORESET); transmitting downlink control information (DCI) to a terminal in a first time unit; and transmitting downlink transmission to the terminal based on at least one default spatial parameter in a second time unit, and based on the at least one codepoint not including a codepoint that a plurality of spatial parameters are configured, the at least one default spatial parameter may be determined based on at least one of a plurality of spatial parameters configured for the CORESET.

According to an embodiment of the present disclosure, a transmission and reception method and device based on a plurality of default spatial parameters may be provided for a predetermined time duration in a wireless communication system.

According to an embodiment of the present disclosure, a transmission and reception method and device based on a plurality of default spatial parameters based on at least one of a spatial parameter configured for a predetermined codepoint or a spatial parameter configured for a control resource set in a wireless communication system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
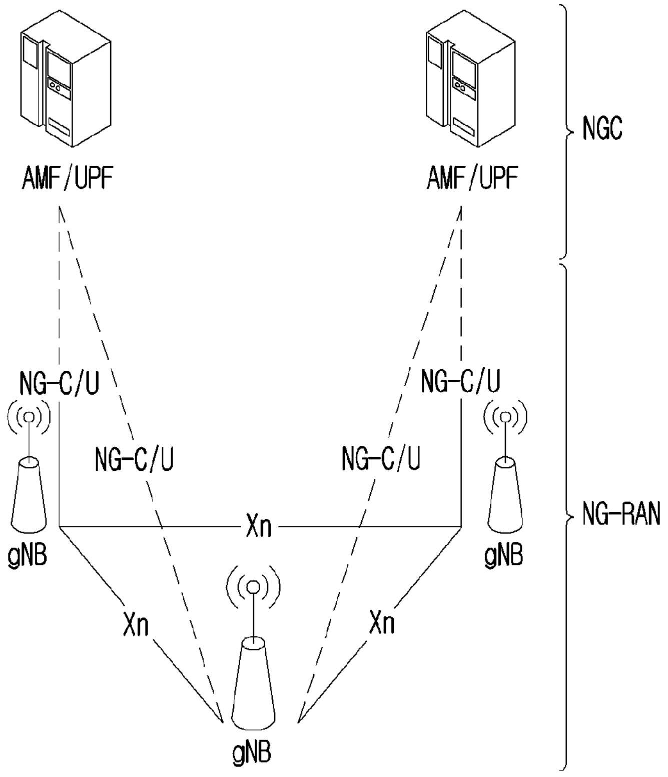
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11(Wi-Fi), IEEE 802.16(WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212(multiplexing and channel coding), TS 38.213(physical layer procedures for control), TS 38.214 (physical layer procedures for data), TS 38.300(NR and NG-RAN(New Generation-Radio Access Network) overall description), TS 38.331(radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
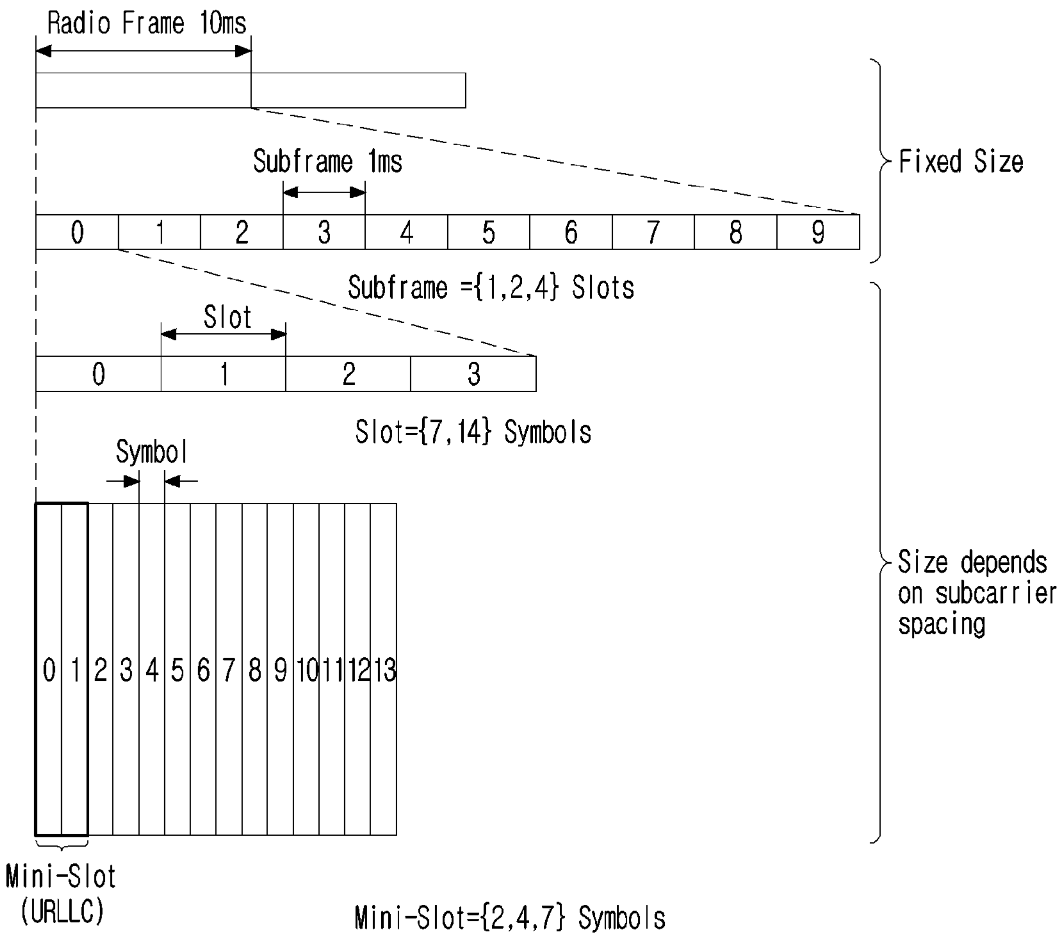
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |

TABLE 1-continued

| μ | $\Delta f = 2^{\mu} \cdot 15$ [kHz] | CP |
|---|---|---|
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot 10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})$ $T_c$ than a corresponding downlink frame in a corresponding terminal starts. For a subcarrier spacing configuration μ, slots are numbered in an increasing order of $n_s^{\mu}\in\{0, \ldots, N_{slot}^{subframe,\mu}-1\}$ in a subframe and are numbered in an increasing order of $n_{s,f}^{\mu}\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{frame,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
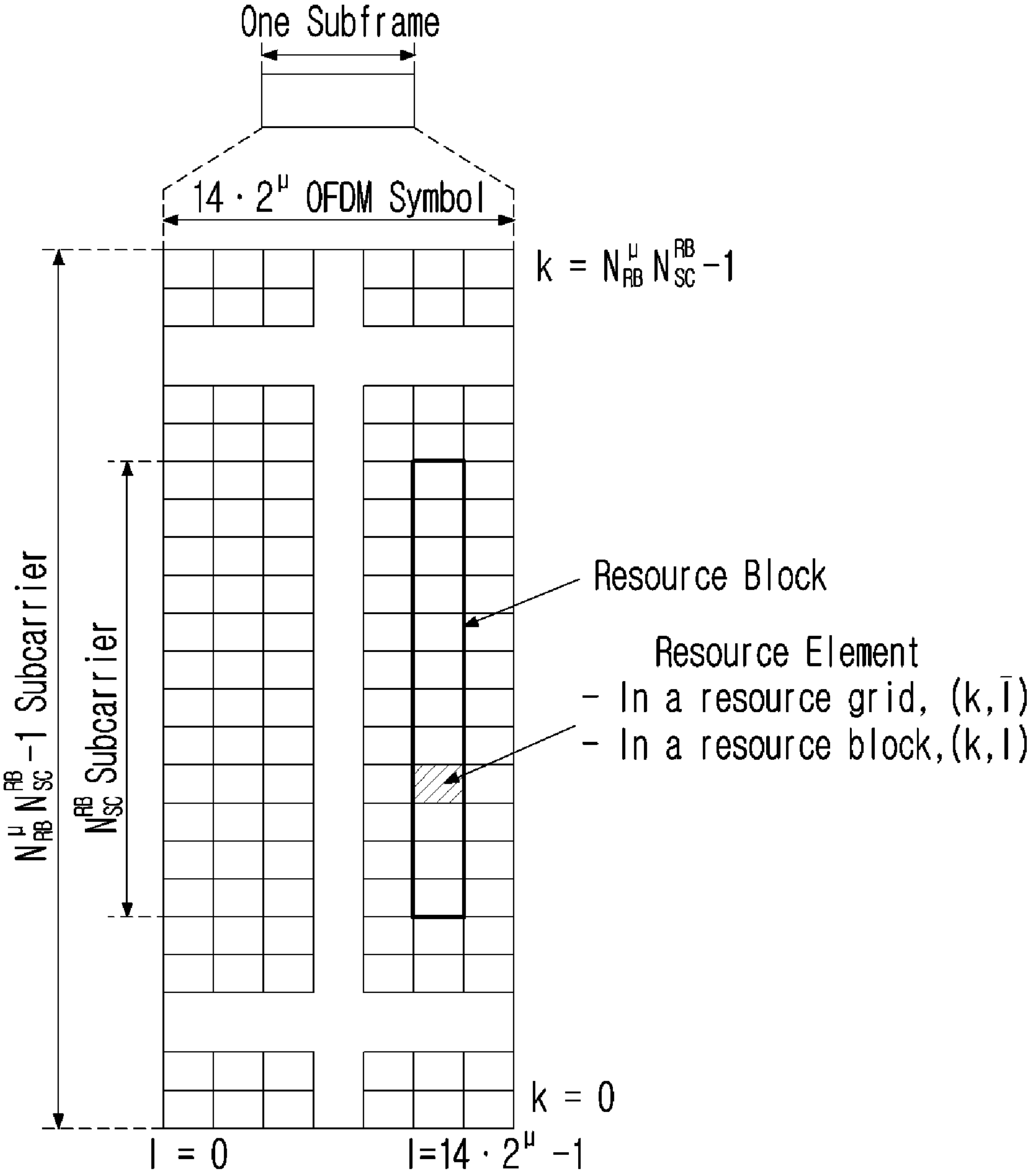
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu}PN_{sc}^{RB}$ subcarriers in a frequency domain and one subframe is configured with $14\cdot 2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu}\geq N_{RB}^{max,\mu}$. The $N_{RB}^{max,u}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^{\mu}N_{sc}^{RB}-1$ is an index in a frequency domain and $l'=0, \ldots, 2^{\mu}N_{symb}^{(\mu)}-1$ refers to a position of a symbol in a subframe. When referring to a resource element in a slot, an index pair (k,l) is used. Here, $1=0, \ldots, N_{symb}^{\mu-1}$. A resource element (k,l') for p and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
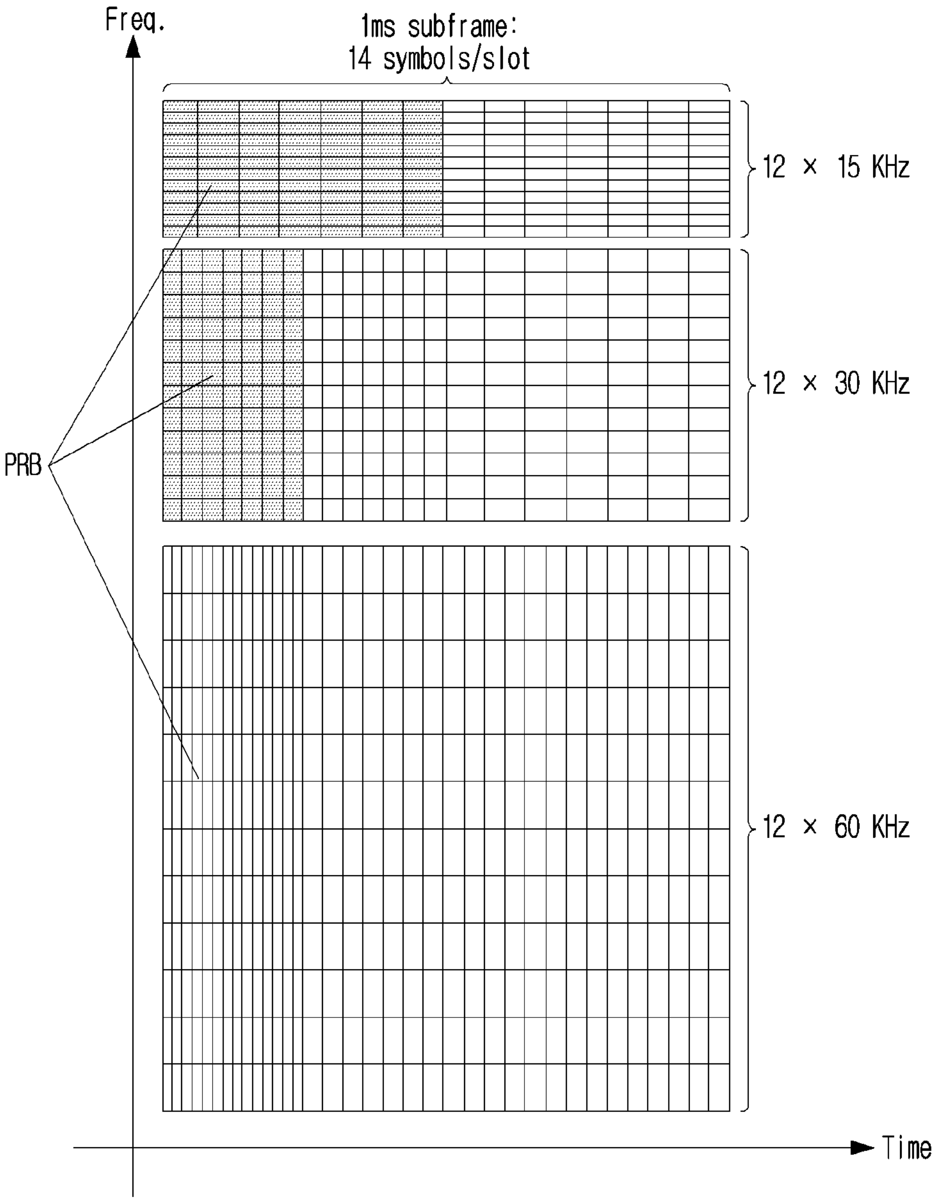
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
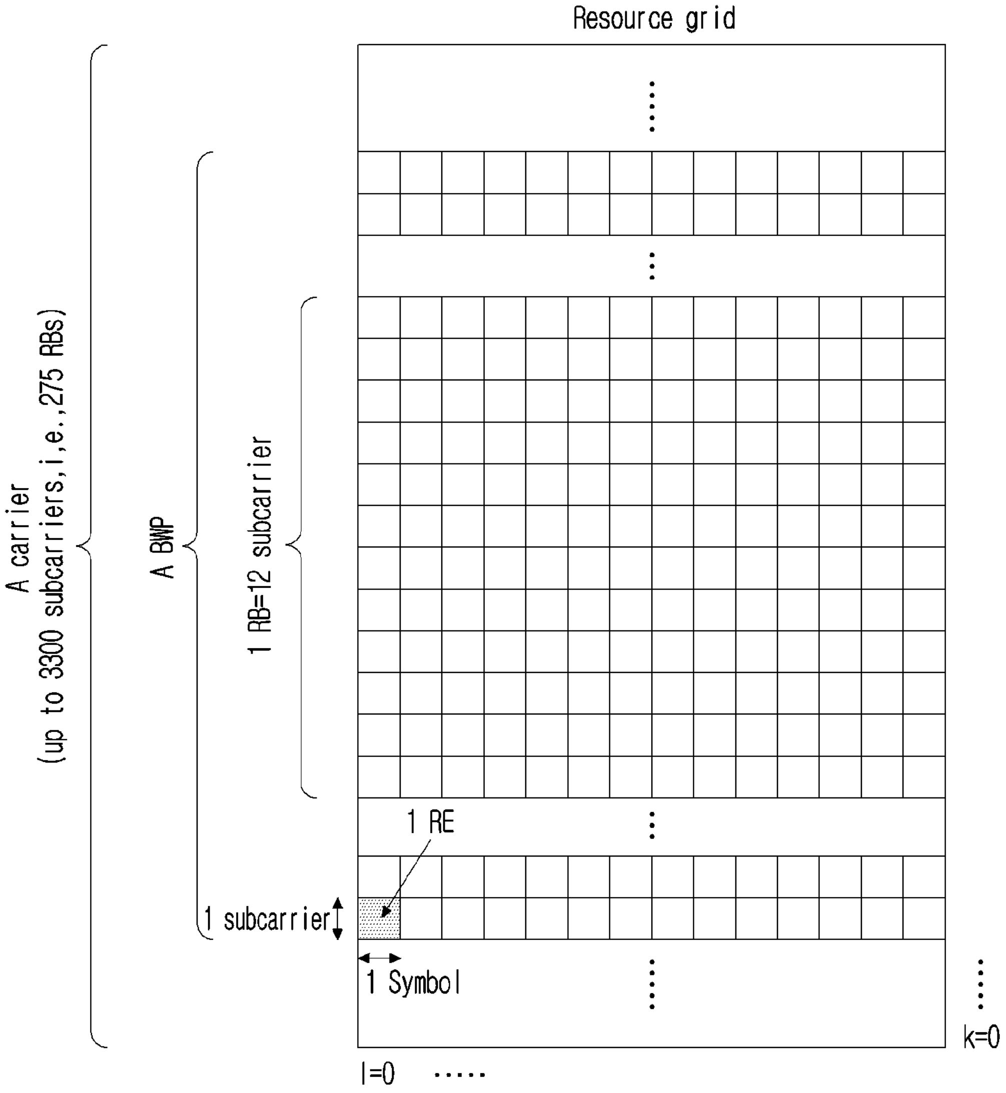
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
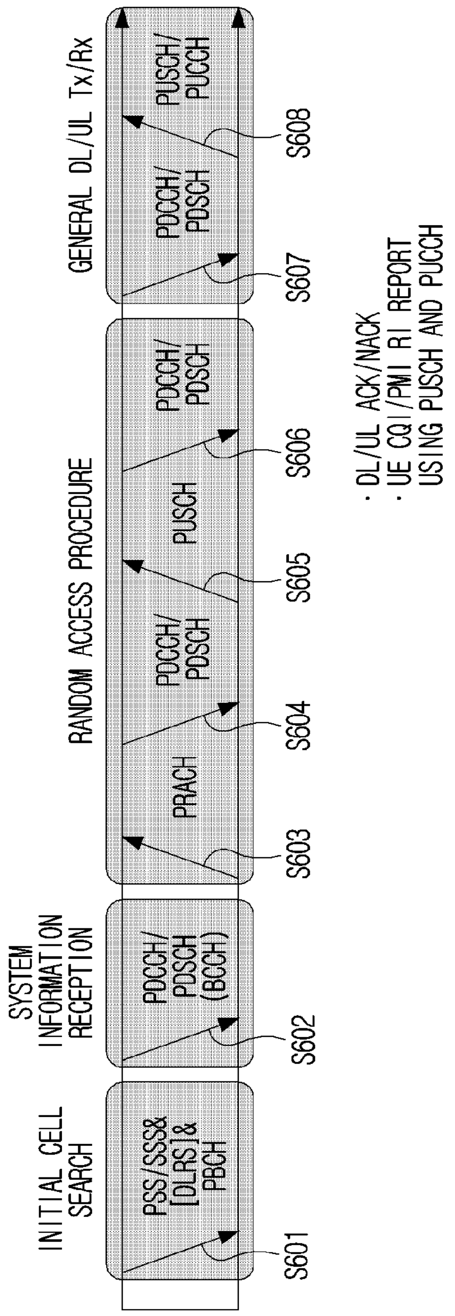
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1-0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 0_0 is used for scheduling of a PDSCH in one DL cell. Information included in DCI format 0_0 is CRC scrambled by a C-RNTI or a CS-RNTI or a MCS-C-RNTI and transmitted.

DCI format 0_1 is used for scheduling of a PDSCH in one cell. Information included in DCI format 0_1 is CRC scrambled by a C-RNTI or a CS-RNTI or a MCS-C-RNTI and transmitted.

DCI format 0_2 is used for scheduling of a PDSCH in one cell. Information included in DCI format 0_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group).

Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words,for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
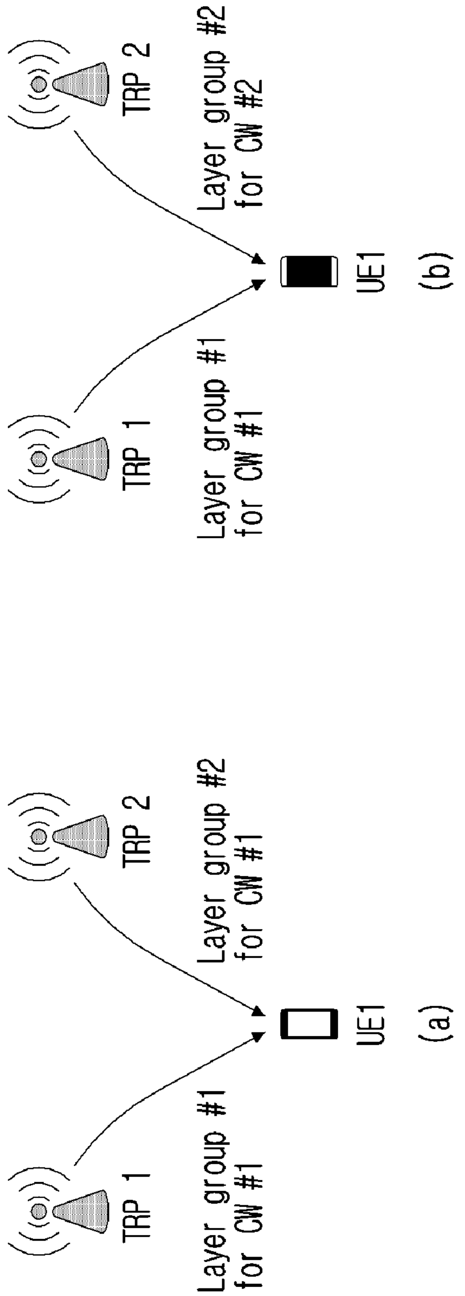
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7(*a*), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(*b*), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(*b*), it may have a disadvantage that a code rate corresponding to a TB is higher compared to FIG. 7(*a*). However, it has an advantage that it may adjust a code rate by indicating a different RV (redundancy version) value or may adjust a modulation order of each CW for encoded bits generated from the same TB according to a channel environment.

According to methods illustrated in FIG. 7(*a*) and FIG. 7(*b*) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following method is discussed.

1) Method 1 (SDM): Time and frequency resource allocation is overlapped and n (n<=Ns) TCI states in a single slot 1-a) Method 1a The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule.

1-b) Method 1b

The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

At one transmission time (occasion), the same TB having one DMRS port associated with multiple TCI state indexes is transmitted in one layer or the same TB having multiple DMRS ports one-to-one associated with multiple TCI state indexes is transmitted in one layer.

In case of the method 1a and 1c, the same MCS is applied to all layers or all layer sets.

2) Method 2 (FDM): Frequency Resource Allocation is not Overlapped and n (n<=Nf) TCI States in a Single Slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the method 2a, the same MCS is applied to all non-overlapping frequency resource allocation.

3) Method 3 (TDM): Time Resource Allocation is not Overlapped and n (n<=Nt1) TCI States in a Single Slot Each transmission time (occasion) of a TB has time granularity of a mini-slot and has one TCI and one RV.

A common MCS is used with a single or multiple DMRS port(s) at every transmission time (occasion) in a slot.

A RV/TCI may be the same or different at a different transmission time (occasion).

4) Method 4 (TDM): N (n<=Nt2) TCI States in K (n<=K) Different Slots

Each transmission time (occasion) of a TB has one TCI and one RV.

Every transmission time (occasion) across K slots uses a common MCS with a single or multiple DMRS port(s).

A RV/TCI may be the same or different at a different transmission time (occasion).

Hereinafter, MTRP URLLC is described.

In the present disclosure, DL MTRP URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

And, in the present disclosure, UL MTRP-URLLC means that multiple TRPs receive the same data/UCI (uplink control information) from any UE by using a different layer/time/frequency resource. For example, TRP 1 receives the same data/DCI from UE in resource 1 and TRP 2 receives the same data/DCI from UE in resource 2 to share received data/DCI through a backhaul link connected between TRPs. UE configured with a UL MTRP-URLLC transmission method transmits the same data/UCI by using a different layer/time/frequency resource. In this case, UE is configured from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 may be configured. Such UL MTRP URLLC may be applied to a PUSCH/a PUCCH.

In addition, in the present disclosure, when a specific TCI state (or TCI) is used (or mapped) in receiving data/DCI/UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and power indicated by a corresponding TCI state in that frequency/time/space resource.

Here, an UL TCI state has Tx beam and/or Tx power information of UE and may configure spatial relation information, etc. to UE through other parameter, instead of a TCI state. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for open loop parameter Po and alpha (up to 32 parameter value sets per cell), q_d: an index of a DL RS resource for PL (pathloss) measurement (up to 4 measurements per cell), 1: a closed loop power control process index (up to 2 processes per cell)).

Hereinafter, MTRP eMBB is described.

In the present disclosure, MTRP-eMBB means that multiple TRPs transmit different data (e.g., a different TB) by using a different layer/time/frequency. UE configured with a MTRP-eMBB transmission method receives an indication on multiple TCI states through DCI and assumes that data received by using a QCL RS of each TCI state is different data.

On the other hand, UE may figure out whether of MTRP URLLC transmission/reception or MTRP eMBB transmission/reception by separately dividing a RNTI for MTRP-URLLC and a RNTI for MTRP-eMBB and using them. In other words, when CRC masking of DCI is performed by using a RNTI for URLLC, UE considers it as URLLC transmission and when CRC masking of DCI is performed by using a RNTI for eMBB, UE considers it as eMBB transmission. Alternatively, a base station may configure MTRP URLLC transmission/reception or TRP eMBB transmission/reception to UE through other new signaling.

In a description of the present disclosure, it is described by assuming cooperative transmission/reception between 2 TRPs for convenience of a description, but a method proposed in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to UE. Accordingly, when UE receives/transmits data/DCI/UCI by using TCI state 1, it means that data/DCI/UCI is received/transmitted from/to a TRP 1.

Hereinafter, methods proposed in the present disclosure may be utilized in a situation that MTRPs cooperatively transmit a PDCCH (repetitively transmit or partitively transmit the same PDCCH). In addition, methods proposed in the present disclosure may be also utilized in a situation that MTRPs cooperatively transmit a PDSCH or cooperatively receive a PUSCH/a PUCCH.

In addition, in the present disclosure, when a plurality of base stations (i.e., MTRPs) repetitively transmit the same PDCCH, it may mean the same DCI is transmitted through multiple PDCCH candidates and it may also mean that a plurality of base stations repetitively transmit the same DCI. Here, the same DCI may mean two DCI with the same DCI format/size/payload. Alternatively, although two DCI has a different payload, it may be considered the same DCI when a scheduling result is the same. For example, a time domain resource assignment (TDRA) field of DCI relatively determines a slot/symbol position of data and a slot/symbol position of A/N (ACK/NACK) based on a reception occasion of DCI, so if DCI received at n occasions and DCI received at n+1 occasions inform UE of the same scheduling result, a TDRA field of two DCI is different and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of the other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRPs) partitively transmit the same PDCCH, it means that one DCI is transmitted through one PDCCH candidate, but TRP 1 transmits some resources that such a PDCCH candidate is defined and TRP 2 transmits the remaining resources. For example, when a PDCCH candidate corresponding to aggregation level m1+m2 is partitively transmitted by TRP 1 and TRP 2, a PDCCH candidate may be divided into PDCCH candidate 1 corresponding to aggregation level m1 and PDCCH candidate 2 corresponding to aggregation level m2, and TRP 1 may transmit PDCCH candidate 1 and TRP 2 may transmit PDCCH candidate 2 to a different time/frequency resource. After receiving PDCCH candidate 1 and PDCCH candidate 2, UE may generate a PDCCH candidate corresponding to aggregation level m1+m2 and try DCI decoding.

In addition, when the same DCI is partitively transmitted to multiple PDCCH candidates, there may be two implementation methods.

According to a first method, a DCI payload (i.e., a control information bit and CRC) may be encoded through one channel encoder (e.g., a polar encoder) and coded bits obtained thereby may be partitively transmitted by a plurality of TRPs. In this case, for coded bits transmitted by each TRP, all DCI payloads may be encoded or only part of DCI payloads may be encoded.

According to a second method, a DCI payload (i.e., a control information bit and CRC) may be divided into a plurality of partial DCI (e.g., for two, first partial DCI and second partial DCI) and each may be encoded through a channel encoder (e.g., a polar encoder). Subsequently, TRP1 may transmit coded bits corresponding to first partial DCI and TRP2 may transmit coded bits corresponding to second partial DCI.

In summary, when a plurality of base stations (MTRPs) partitively/repetitively transmit the same PDCCH across a plurality of MOs, it may include the following meaning.

For example, coded DCI bits encoding all DCI contents of a corresponding PDCCH may be repetitively transmitted per each base station (STRP) and the same coded DCI bits may be repetitively transmitted through each MO.

Alternatively, coded DCI bits encoding all DCI contents of a corresponding PDCCH may be divided into a plurality of parts and a different part may be transmitted per each base station (STRP) through each MO.

Alternatively, DCI contents of a corresponding PDCCH may be divided into a plurality of parts and a different part may be separately encoded per each base station (STRP) and transmitted through each MO.

Regardless of whether a PDCCH is repetitively transmitted or partitively transmitted, it may be understood that a PDCCH is transmitted multiple times across multiple transmission occasions (TO). A TO may mean a specific time/frequency resource unit that a PDCCH is transmitted. For example, when a PDCCH is transmitted multiple times across slot 1, 2, 3, 4 (through a specific same RB), a TO may mean each slot. Alternatively, when a PDCCH is transmitted multiple times across RB set 1, 2, 3, 4 (in a specific same slot), a TO may mean each RB set. Alternatively, when a PDCCH is transmitted multiple times across a different time resource and frequency resource, a TO may mean each combination of time-frequency resources.

In addition, a TCI state used for DMRS channel estimation may be differently configured per TO. A TO that a TCI state is differently configured may be assumed to be transmitted by a different TRP/panel. When a plurality of base stations repetitively or partitively transmit a PDCCH, it may mean that a PDCCH is transmitted across multiple TOs and a union of TCI states configured for a corresponding TO includes at least two TCI states. For example, when a PDCCH is transmitted across TO 1, 2, 3, 4, TCI state 1, 2, 3, 4 may be configured for each of TO 1, 2, 3, 4, which may mean that TRP i cooperatively transmits a PDCCH in TO i.

In addition, in the present disclosure, when UE repetitively transmits the same PUSCH so that a plurality of base stations (i.e., MTRPs) can receive it, it may mean that UE transmitted the same data through multiple PUSCHs. In this case, each PUSCH may be optimized and transmitted to an UL channel of a different TRP. For example, when UE repetitively transmits the same data through PUSCH 1 and 2, PUSCH 1 is transmitted by using UL TCI state 1 for TRP 1 and in this case, link adaptation such as a precoder/MCS, etc. may be also scheduled/applied to a value optimized for a channel of TRP 1. PUSCH 2 is transmitted by using UL TCI state 2 for TRP 2 and link adaptation such as a precoder/MCS, etc. may be also scheduled/applied to a value optimized for a channel of TRP 2. In this case, PUSCH 1 and 2 which are repetitively transmitted may be transmitted at a different time to be TDM, FDM or SDM.

In addition, in the present disclosure, when UE partitively transmits the same PUSCH so that a plurality of base stations (i.e., MTRPs) can receive it, it may mean that UE transmits one data through one PUSCH, but it divides resources allocated to that PUSCH, optimizes them for an UL channel of a different TRP and transmits them. For example, when UE transmits the same data through 10 symbol PUSCHs, data is transmitted by using UL TCI state 1 for TRP 1 in 5 previous symbols and in this case, link adaptation such as a precoder/MCS, etc. may be also scheduled/applied to a value optimized for a channel of TRP 1. The remaining data is transmitted by using UL TCI state 2 for TRP 2 in the remaining 5 symbols and in this case, link adaptation such as a precoder/MCS, etc. may be also scheduled/applied to a value optimized for a channel of TRP 2. In the example, transmission for TRP 1 and transmission for TRP 2 are TDM-ed by dividing one PUSCH into time resources, but it may be transmitted by a FDM/SDM method.

In addition, similarly to the above-described PUSCH transmission, also for a PUCCH, UE may repetitively transmit the same PUCCH or may partitively transmit the same PUCCH so that a plurality of base stations (i.e., MTRPs) receive it.

Hereinafter, a proposal of the present disclosure may be extended and applied to a variety of channels such as a PUSCH/a PUCCH/a PDSCH/a PDCCH, etc.

A proposal of the present disclosure may be extended and applied to both a case in which various uplink/downlink channels are repetitively transmitted to a different time/frequency/space resource and a case in which various uplink/downlink channels are partitively transmitted to a different time/frequency/space resource.

Control Resource Set (CORESET)

A predetermined resource used for monitoring a downlink control channel (e.g., a PDCCH) may be defined based on a control channel element (CCE), a resource element group (REG) and a control resource set (CORESET). In addition, the predetermined resource may be defined as a resource which is not used for a DMRS associated with a downlink control channel.

A CORESET corresponds to a time-frequency resource which tries decoding of a control channel candidate by using one or more search spaces (SS). For example, a CORESET is defined as a resource that a terminal may receive a PDCCH and a base station does not necessarily transmit a PDCCH in a CORESET.

In a time-frequency domain, a size and a position of a CORESET may be configured semi-statically by a network. In a time domain, a CORESET may be positioned in any symbol in a slot. For example, a time length of a CORESET may be defined as up to 2 or 3 symbol durations. In a frequency domain, a CORESET may be positioned at a position of any frequency in an active bandwidth part (BWP) within a carrier bandwidth. A frequency size of a CORESET may be defined as a multiple of 6 RB units in a carrier bandwidth (e.g., 400 MHz) or less. A time-frequency position and size of a CORESET may be configured by RRC signaling.

A first CORESET (or CORESET 0) may be configured by a master information block (MIB) provided through a PBCH. A MIB may be obtained by a terminal from a network at an initial access step and a terminal may monitor a PDCCH including information scheduling system information block1 (SIB1) in CORESET 0 configured by a MIB. After a terminal is configured for connection, one or more CORESETs may be additionally configured through RRC signaling. An identifier may be allocated to each of a plurality of CORESETs. A plurality of CORESETs may be overlapped each other.

A PDSCH in a slot may be also positioned before starting or after ending a PDCCH in a CORESET. In addition, an unused CORESET resource may be reused for a PDSCH.

For it, a reserved resource is defined, which may be overlapped with a CORESET. For example, one or more reserved resource candidates may be configured and each of reserved resource candidates may be configured by a bitmap in a time resource unit and a bitmap in a frequency resource unit. Whether a configured reserved resource candidate is activated (or whether it may be used for a PDSCH) may be dynamically indicated or may be semi-statically configured through DCI.

One CCE-to-REG mapping relationship may be defined for each CORESET. Here, one REG is a unit corresponding to one OFDM symbol and one RB (i.e., 12 subcarriers). One CCE may correspond to 6 REGs. A CCE-to-REG mapping relationship of a different CORESET may be the same or may be configured differently. A mapping relationship may be defined in a unit of a REG bundle. A REG bundle may correspond to a set of REG(s) that a terminal assumes consistent precoding will be applied. CCE-to-REG mapping may include or may not include interleaving. For example, when interleaving is not applied, a REG bundle configured with 6 consecutive REGs may form one CCE. When interleaving is applied, a size of a REG bundle may be 2 or 6 when a time duration length of a CORESET is 1 or 2 OFDM symbols and a size of a REG bundle may be 3 or 6 when a time duration length of a CORESET is 3 OFDM symbols. A block interleaver may be applied so that a different REG bundle will be dispersed in a frequency domain and mapped to a CCE. The number of rows of a block interleaver may be variably configured for a variety of frequency diversities.

In order for a terminal to receive a PDCCH, channel estimation using a PDCCH DMRS may be performed. A PDCCH may use one antenna port (e.g., antenna port index 2000). A PDCCH DMRS sequence is generated across the entire common resource block in a frequency domain, but it may be transmitted only in a resource block that an associated PDCCH is transmitted. Meanwhile, before a terminal obtains system information in an initial access process, a position of a common resource block may not be known, so for CORESET 0 configured by a MIB provided through a PBCH, a PDCCH DMRS sequence may be generated from a first resource block of CORESET 0. A PDCCH DMRS may be mapped to every fourth subcarrier in a REG. A terminal may perform channel estimation in a unit of a REG bundle by using a PDCCH DMRS.

Quasi-Co Locaton (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

When HARQ-ACK corresponding to a PDSCH carrying an activation command is transmitted in a slot n, mapping indicated between a TCI state and a codepoint of a DCI field 'Transmission Configuration Indication' may be applied by starting from a slot $n+3N_{slot}^{subframe,\mu}+1$. After UE receives an initial higher layer configuration for TCI states before receiving an activation command, UE may assume for QCL-TypeA, and if applicable, for QCL-TypeD that a DMRS port of a PDSCH of a serving cell is quasi-colocated with a SS/PBCH block determined in an initial access process.

When a higher layer parameter (e.g., tci-PresentInDCI) indicating whether there is a TCI field in DCI configured for UE is set to be enabled for a CORESET scheduling a PDSCH, UE may assume that there is a TCI field in DCI format 1_1 of a PDCCH transmitted in a corresponding CORESET. When tci-PresentInDCI is not configured for a CORESET scheduling a PDSCH or when a PDSCH is scheduled by DCI format 1_0 and a time offset between reception of DL DCI and a corresponding PDSCH is equal to or greater than a predetermined threshold (e.g., timeDurationForQCL), in order to determine a PDSCH antenna port QCL, UE may assume that a TCI state or a QCL assumption for a PDSCH is the same as a TCI state or a QCL assumption applied to a CORESET used for PDCCH transmission. Here, the predetermined threshold may be based on reported UE capability.

When a parameter tci-PresentInDCI is set to be enabled, a TCI field in DCI in a scheduling CC (component carrier) may indicate an activated TCI state of a scheduled CC or a DL BWP. When a PDSCH is scheduled by DCI format 1_1, UE may use a TCI-state according to a value of a 'Transmission Configuration Indication' field of a detected PDCCH having DCI to determine a PDSCH antenna port QCL.

When a time offset between reception of DL DCI and a corresponding PDSCH is equal to or greater than a predetermined threshold (e.g., timeDurationForQCL), UE may assume that a DMRS port of a PDSCH of a serving cell is quasi-colocated with RS(s) in a TCI state for QCL type parameter(s) given by an indicated TCI state.

When a single slot PDSCH is configured for UE, an indicated TCI state may be based on an activated TCI state of a slot having a scheduled PDSCH.

When multiple-slot PDSCHs are configured for UE, an indicated TCI state may be based on an activated TCI state of a first slot having a scheduled PDSCH and UE may expect that activated TCI states across slots having a scheduled PDSCH are the same.

When a CORESET associated with a search space set for cross-carrier scheduling is configured for UE, UE may expect that a tci-PresentInDCI parameter is set to be enabled for a corresponding CORESET. When one or more TCI states are configured for a serving cell scheduled by a search space set including QCL-TypeD, UE may expect that a time offset between reception of a PDCCH detected in the search space set and a corresponding PDSCH is equal to or greater than a predetermined threshold (e.g., timeDurationForQCL).

For both of a case in which a parameter tci-PresentInDCI is set to be enabled and a case in which tci-PresentInDCI is not configured in a RRC connected mode, when a time offset between reception of DL DCI and a corresponding PDSCH is less than a predetermined threshold (e.g., timeDurationForQCL), UE may assume that a DMRS port of a PDSCH of a serving cell is quasi-colocated with RS(s) for QCL parameter(s) used for PDCCH QCL indication of a CORESET associated with a monitored search space having the lowest CORESET-ID in the latest slot where one or more CORESETs in an activated BWP of a serving cell is monitored by UE.

In this case, when QCL-TypeD of a PDSCH DMRS is different from QCL-TypeD of a PDCCH DMRS and they are overlapped in at least one symbol, UE may expect that reception of a PDCCH associated with a corresponding CORESET will be prioritized. It may be also applied to intra-band CA (carrier aggregation) (when a PDSCH and a CORESET exist in a different CC). When any of configured TCI states does not include QCL-TypeD, a different QCL assumption may be obtained from TCI states indicated for a scheduled PDSCH, regardless of a time offset between reception of DL DCI and a corresponding PDSCH.

For a periodic CSI-RS resource of configured NZP-CSI-RS-ResourceSet including a higher layer parameter trs-Info, UE may expect a TCI state to indicate one of the following QCL type(s).

QCL-TypeC with a SS/PBCH block, and if applicable, QCL-TypeD with the same SS/PBCH block, or QCL-TypeC with a SS/PBCH block, and if applicable, QCL-TypeD with a CSI-RS resource in configured NZP-CSI-RS-ResourceSet including a higher layer parameter repetition For an aperiodic CSI-RS resource of configured NZP-CSI-RS-ResourceSet including a higher layer parameter trs-Info, UE may expect a TCI state to indicate QCL-TypeA with a periodic CSI-RS resource of NZP-CSI-RS-ResourceSet including a higher layer parameter trs-Info, and if applicable, QCL-TypeD with the same periodic CSI-RS resource.

For a CSI-RS resource of NZP-CSI-RS-ResourceSet configured without a higher layer parameter trs-Info and without a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a SS/PBCH block, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or when QCL-TypeD is not applicable, QCL-TypeB with a CSI-RS resource in configured NZP-CSI-RS-ResourceSet including a higher layer parameter trs-Info For a CSI-RS resource of configured NZP-CSI-RS-ResourceSet including a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeC with a SS/PBCH block, and if applicable, QCL-TypeD with the same SS/PBCH block.

For a DMRS of a PDCCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

For a DMRS of a PDSCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

Downlink Transmission and Reception Based on Default Spatial Parameter

In the following description, a term of "spatial parameter" may refer to a beam transmission and reception related parameter referred to for downlink reception or uplink transmission of a terminal.

For example, a spatial parameter related to downlink transmission and reception may include QCL information which is applied to a physical channel that downlink control information or data is transmitted and received or which is assumed by a terminal. QCL information may include QCL RS information and QCL RS information may be configured per QCL type (e.g., QCL type A/B/C/D). For example, downlink control information (DCI) may be transmitted and received through a PDCCH and a spatial parameter related to DCI transmission and reception may include QCL reference information, TCI state information, etc. for PDCCH DMRS antenna port(s). In addition, downlink data may be transmitted and received through a PDSCH and a spatial parameter related to downlink data transmission and reception may include QCL reference information, TCI state information, etc. for PDSCH DMRS antenna port(s).

But, in the present disclosure, a term of spatial parameter is not limited to QCL information and may include a spatial parameter applied to uplink transmission (e.g., spatial relation information (spatial relation info) related to an uplink transmission beam). For example, uplink control information (UCI) may be transmitted and received through a PUCCH and/or a PUSCH and a spatial parameter related to UCI transmission and reception may include a PRI (PUCCH resource indicator) related to PUCCH/PUSCH transmission and reception, spatial relation info or a QCL reference RS related thereto, etc.

In addition, a spatial parameter may be separately configured for a downlink or an uplink or may be integrated and configured for a downlink and an uplink.

In addition, a spatial parameter may be also defined or configured as a spatial parameter set including at least one spatial parameter. Hereinafter, at least one spatial parameter is collectively referred to as a spatial parameter to simplify a description.

In the following description, a term of spatial parameter for downlink/uplink transmission and reception may be substituted with a variety of terms such as spatial relation info, a beam, a transmission beam, a reception beam, a TCI state, a QCL RS, a QCL reference RS, etc. and in some examples, those terms may be used for a description instead of a spatial parameter.

In addition, what is configured as default among spatial parameters may be referred to as a default spatial parameter. When a specific spatial parameter is configured as default, it may include that it is configured/defined in advance to be applied to a case in which a predetermined condition is satisfied (e.g., when a separate configuration/indication for a spatial parameter is not available for a terminal and so on).

A default spatial parameter may be substituted with a term such as default spatial relation information, a default beam, a default transmission beam, a default reception beam, a default TCI state, etc. and in some examples, those terms may be used for a description instead of a default spatial parameter.

In addition, in the present disclosure, a reference signal (RS) is used as a term which includes a physical layer signal/channel such as a synchronization signal and/or a SS/PBCH block as well as various types of RSs defined in a standard. In addition, a beam may correspond to a RS configuration/resource.

Figure 8:
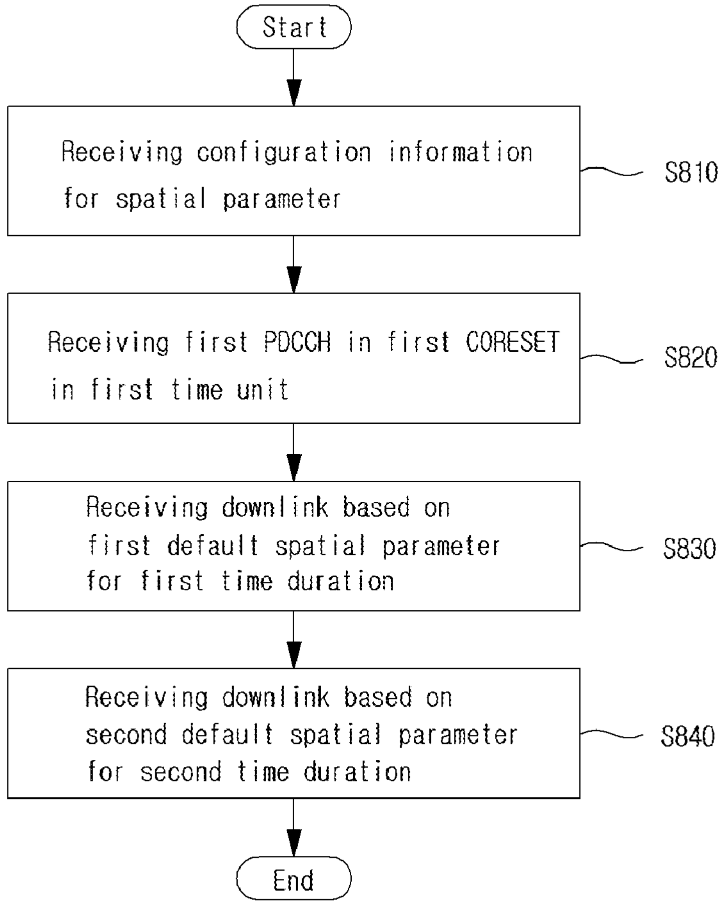
FIG. 8 is a diagram for describing a downlink reception operation based on a default beam of a terminal according to an embodiment of the present disclosure.

FIG. 8 is a diagram for describing a downlink reception operation based on a default beam of a terminal according to an embodiment of the present disclosure.

In S810, a terminal may receive configuration information for a spatial parameter from a base station.

Configuration information for a spatial parameter may include at least one of a spatial parameter configured for a predetermined codepoint or a spatial parameter configured for a control resource set.

For example, a spatial parameter may be a TCI state. But, a scope of the present disclosure is not limited to a TCI state and includes a variety of other examples on a spatial parameter as described above.

In addition, a predetermined codepoint may be a TCI codepoint. But, a scope of the present disclosure is not limited to a TCI codepoint and includes a codepoint in a variety of formats mapped to at least one spatial parameter. At least one TCI codepoint may be preconfigured for a terminal. One TCI codepoint may be mapped to one TCI state or may be mapped to a plurality of TCI states. In addition, at least one TCI codepoint may include at least one codepoint mapped to one TCI state and may include at least 0 codepoint mapped to a plurality of TCI states. When a transmission configuration indication (TCI) field is included in DCI, a specific (at least one) codepoint may be indicated by the field and accordingly, a terminal may determine TCI state(s) mapped to the specific (at least one) codepoint.

In addition, at least one TCI state(s) may be preconfigured for one control resource set (CORESET). At least one CORESET may be configured for a terminal and at least one TCI state(s) may be configured for each CORESET.

In S820, a terminal may receive a first PDCCH in a first CORESET in a first time unit.

For example, a time unit may be a slot. But, a scope of the present disclosure is not limited to a slot and may include a variety of time domain units including a symbol, a symbol group, a slot group, a sub-slot, a sub-frame, a sub-frame group, a frame, etc.

It takes time to process a first PDCCH received by a terminal and check spatial parameter information included in DCI (e.g., a TCI field). In other words, it is assumed that a terminal may not know a spatial parameter indicated by DCI for a predetermined time duration (e.g., higher layer parameter timeDurationForQCL). Accordingly, a terminal may receive/buffer downlink transmission based on a default spatial parameter, not a spatial parameter indicated by DCI, for a predetermined time duration (e.g., timeDurationForQCL). As such, a time duration to which a default spatial parameter or a default beam is applied may be referred to as a default spatial parameter duration or a default beam duration.

In S830, a terminal may perform downlink reception based on a first default spatial parameter for a first time duration.

A first time duration starts in a first time unit, and may end after a preconfigured/predefined predetermined time length (e.g., timeDurationForQCL). For example, when a time offset between a first time unit, a reception time of a PDCCH/DCI in S820, and a second time unit, a reception time of downlink transmission in S830, is equal to or less than a threshold for a predetermined time length (e.g., timeDurationForQCL), downlink reception may be performed based on a first default spatial parameter.

When at least one codepoint which is preconfigured for a terminal includes a specific codepoint that a plurality of spatial parameters are configured, a first default spatial parameter may be determined based on a plurality of spatial parameters configured for the specific codepoint.

When at least one codepoint which is preconfigured for a terminal does not include a codepoint that a plurality of spatial parameters are configured, a first default spatial parameter may be determined based on a spatial parameter configured for a first CORESET.

In S840, a terminal may perform downlink reception based on a second default spatial parameter for a second time duration.

A second time duration starts in a second time unit, and may end in a time unit where a first time duration ends. A second time unit may have a time domain position later than a first time unit. In addition, at least one second CORESET may be configured in a second time unit.

When the at least one second CORESET includes a specific CORESET that a plurality of spatial parameters are configured, a second default spatial parameter may be determined based on a plurality of spatial parameters configured for the specific CORESET.

When the at least one second CORESET does not include a CORESET that a plurality of spatial parameters are configured, a second default spatial parameter may be determined based on a plurality of spatial parameters configured in a predetermined codepoint.

To sum up the above-described S830 and S840, within a predetermined time duration (e.g. a time duration that an offset between a first time unit and a time unit where a terminal receives downlink transmission from a base station is equal to or less than a predetermined threshold (e.g., timeDurationForQCL)), a default spatial parameter for downlink transmission and reception may be determined or updated. In other words, a default spatial parameter determined as in S830 may be updated as in S840. For example, among a time unit that downlink transmission and reception is performed and time units before a time unit that downlink transmission and reception is performed (i.e., before a time unit that downlink transmission and reception is performed), based on whether a CORESET that a plurality of spatial parameters are configured is included in at least one CORESET associated with a search space monitored by a terminal in "a latest time unit" and whether a codepoint that a plurality of spatial parameters are configured is included in a predetermined codepoint, a default spatial parameter may be determined or updated.

Figure 9:
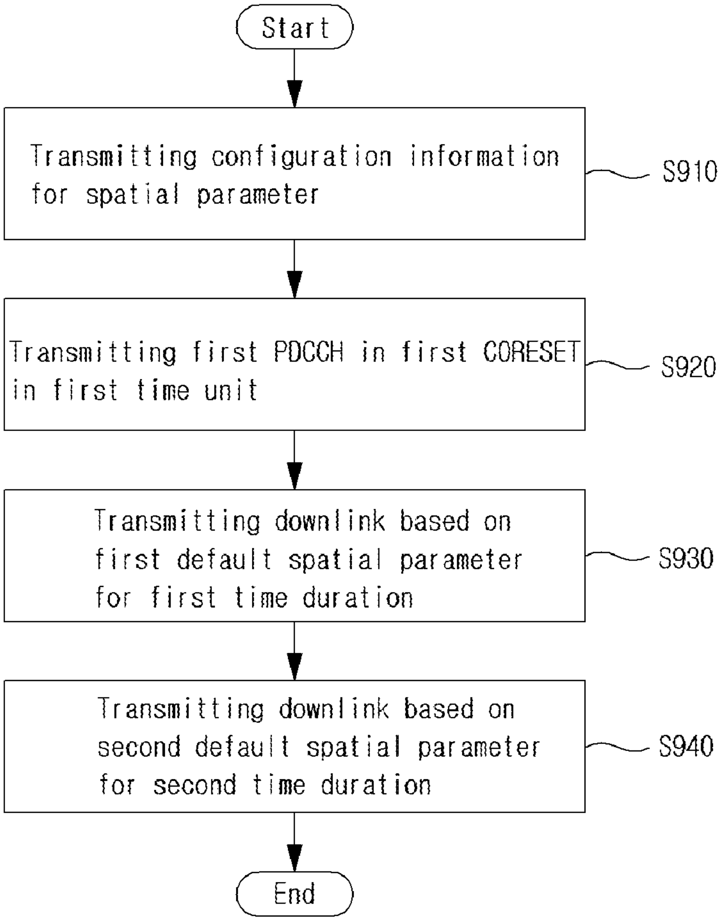
FIG. 9 is a diagram for describing a downlink transmission operation based on a default beam of a base station according to an embodiment of the present disclosure.

FIG. 9 is a diagram for describing a downlink transmission operation based on a default beam of a base station according to an embodiment of the present disclosure.

In S910, a base station may transmit configuration information for a spatial parameter to a terminal.

Configuration information for a spatial parameter may include at least one of a spatial parameter configured for a predetermined codepoint or a spatial parameter configured for a control resource set. As a specific description thereon is overlapped with S810 in FIG. 8, it is omitted.

In S920, a base station may transmit a first PDCCH to a terminal in a first CORESET in a first time unit. As a specific description thereon is overlapped with S820 in FIG. 8, it is omitted.

In S930, a base station may perform downlink transmission based on a first default spatial parameter for a first time duration. As a specific description thereon is overlapped with S830 in FIG. 8, it is omitted.

In S940, a base station may perform downlink reception based on a second default spatial parameter for a second time duration. As a specific description thereon is overlapped with S840 in FIG. 8, it is omitted.

As in the above-described examples, a terminal may receive/buffer downlink transmission based on a default spatial parameter for a predetermined time duration and here, a default spatial parameter may be determined/updated according to the above-described example. In addition, a base station may perform downlink transmission based on a default spatial parameter for a determined time duration.

In the above-described examples, downlink transmission may include at least one of data scheduled by DCI of a PDCCH (e.g., a PDSCH) or an aperiodic (AP) CSI-RS associated with CSI report triggered by DCI of a PDCCH. But, the present disclosure is not limited to a PDSCH/an AP CSI-RS, and may include a variety of downlink transmission to which transmission and reception based on a default spatial parameter is applied.

In various examples described above and below, when downlink transmission is an AP CSI-RS, timeDurationForQCL, an example of a higher layer parameter associated with a length of the first/second time duration, may be replaced with beamSwitchTiming reported by a terminal when downlink transmission is a PDSCH.

For example, for each aperiodic CSI-RS resource of a CSI-RS resource set associated with each CSI triggering state, through qcl-info, higher layer signaling including a list of references for a TCI state for an aperiodic CSI-RS resource associated with a CSI triggering state, UE may receive an indication on a QCL configuration for QCL RS source(s) and QCL type(s). When a state included in the list is configured as a reference for a RS associated with QCL-TypeD, a corresponding RS may be a SS/PBCH block positioned in the same or different CC/DL BWP, or may be a periodically or semi-persistently configured CSI-RS resource positioned in the same or different CC/DL BWP.

Here, when a scheduling offset between a last symbol of a PDCCH carrying triggering DCI and a first symbol of an aperiodic CSI-RS resource of NZP-CSI-RS-ResourceSet configured without a higher layer parameter trs-info is smaller than the threshold when a reported value of a predetermined threshold related to beam switching time reported by UE (e.g., beamSwitchTiming) is one of {14, 28, 48} or when the scheduling offset is smaller than 48 when a reported value is one of {224, 336}, an operation may be performed as follows.

If there is other DL signal having a TCI state indicated in the same symbol as a CSI-RS, UE may apply a QCL assumption of the other DL signal even when receiving an aperiodic CSI-RS. The other DL signal may correspond to a PDSCH scheduled with an offset equal to or greater than a timeDurationForQCL threshold, an aperiodic CSI-RS scheduled with an offset equal to or greater than that when a value of a beamSwitchTiming threshold reported by UE is one of {14, 28, 48}, an aperiodic CSI-RS scheduled with an offset equal to or greater than that when a value of a beamSwitchTiming threshold reported by UE is one of {224, 336}, a periodic CSI-RS, a semi-persistent CSI-RS.

If there is no other DL signal having a TCI state indicated in the same symbol as a CSI-RS, when receiving an aperiodic CSI-RS, UE may apply a QCL assumption used for a CORESET associated with a monoitored search space having a lowest controlResourceSetId in a latest slot that at least one CORESET in an activated BWP of a serving cell is monitored.

when a scheduling offset between a last symbol of a PDCCH carrying triggering DCI and a first symbol of an aperiodic CSI-RS resource is equal to or greater than the threshold when a reported value of a predetermined threshold related to beam switching time reported by UE (e.g., beamSwitchTiming) is one of {14, 28, 48} or when the scheduling offset is equal to or greater than 48 when a reported value is one of {224, 336}, UE may expect to apply a QCL assumption of an indicated TCI state to an aperiodic CSI-RS resource of a CSI triggering state indicated by a CSI trigger field of DCI.

In other words,for a predetermined time duration from a PDCCH/DCI reception time (e.g., timeDurationForQCL or beamSwitchTiming), a terminal may receive/buffer downlink transmission based on a default spatial parameter and a default spatial parameter may be clearly determined/updated by the above-described example in FIG. 8 and specific examples described below. A base station may also perform downlink transmission based on a default spatial parameter expected by a terminal.

Hereinafter, specific examples of the present disclosure on a downlink transmission and reception operation based on a default spatial parameter are described.

Figure 10:
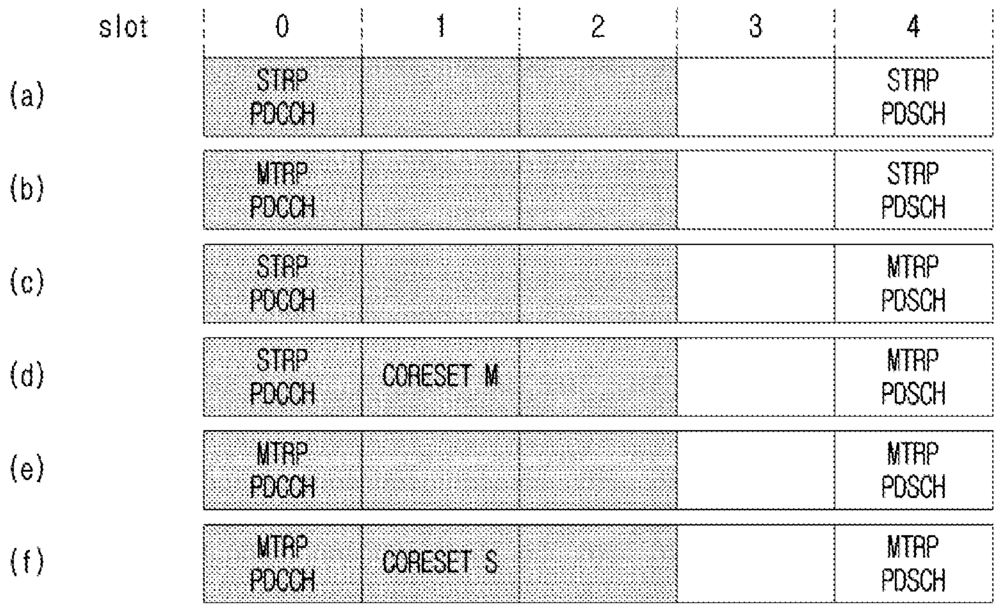
FIG. 10 is a diagram for describing a downlink transmission and reception operation based on a default spatial parameter according to various examples of the present disclosure.

FIG. 10 is a diagram for describing a downlink transmission and reception operation based on a default spatial parameter according to various examples of the present disclosure.

In reference to FIG. 10(*a*), a default spatial parameter determination for a case in which a PDCCH is transmitted from a single TRP (i.e., a STRP) and a PDSCH from a STRP is scheduled by a corresponding PDCCH is described.

It takes a certain period of time to perform PDCCH decoding after receiving a PDCCH in a terminal. Accordingly, a PDSCH may be received based on a default beam and stored in a buffer for the certain period of time. Such a default beam may be determined as a beam configured for a CORESET having a lowest ID in a latest slot that a CORESET is configured. In addition, the certain period of time may be determined through a RRC parameter called timeDurationForQCL.

In FIG. 10(*a*), in 5 slots (slot 0 to 4), an example that a PDSCH is scheduled through a PDCCH/DCI is shown. As one TRP transmits a PDCCH and one TRP transmits a PDSCH, a terminal may be configured with one TCI state for receiving a PDCCH and one TCI state for receiving a PDSCH.

A TCI state for receiving a PDSCH may be configured by two methods. As a first method, based on a TCI state configured for a CORESET corresponding to a PDCCH/DCI scheduling a PDSCH, a TCI state for receiving a PDSCH may be determined. As a second method, based on a TCI state indicated by a TCI field in DCI scheduling a PDSCH, a TCI state for receiving a PDSCH may be determined.

For a second method, a specific (at least one) codepoint may be indicated by a TCI field in DCI among at least one TCI codepoint configured by a higher layer. At least one TCI codepoint that a plurality of TCI states are configured may be included in at least one TCI codepoint which may be indicated by a TCI field and each one TCI state may be configured for remaining TCI codepoint(s). In this case, in a state that DCI decoding is not completed for a default spatial parameter duration in a terminal, whether there is one or a plurality of TCI states configured for PDSCH reception (i.e., indicated by a TCI field in DCI) is not clear for a terminal. Accordingly, a terminal may assume a STRP PDSCH only when each one TCI state is configured for all TCI codepoints (configured by a higher layer). Otherwise (i.e., when among TCI codepoints (configured by a higher layer), even one TCI codepoint that a plurality of TCI states are configured is included), a terminal may assume a MTRP PDSCH (e.g., PDSCH NCJT transmission). Alternatively, for a second method, a base station may configure a third factor which may indicate whether of a STRP PDSCH or a MTRP PDSCH to a terminal.

Slots shaded in examples of FIG. 10 may include a default spatial parameter duration. For example, when a value of a timeDurationForQCL parameter is configured as 28 OFDM symbols and a PDCCH is transmitted in slot 0, a terminal may receive a downlink signal based on a default spatial parameter to some symbols of slot 2 that 28 symbols passed from PDCCH reception.

In FIG. 10(*a*), if a latest slot that a CORESET is configured is slot 0 and only one CORESET is configured at this time, a spatial parameter configured for a corresponding CORESET (e.g., TCI state(s)) may be finally determined as a default spatial parameter. A PDSCH may be transmitted in slot 4 and a terminal may complete DCI decoding in slot 4, so a spatial parameter for downlink reception may be determined and applied based on TCI state(s) indicated by a TCI field of DCI.

Embodiment 1

This embodiment is about an example which determines at least one default spatial parameter applied to downlink transmission and reception among a plurality of default spatial parameter candidates configured for a CORESET in a predetermined time duration (e.g., a default spatial parameter duration).

In reference to FIG. 10(*b*), a default spatial parameter determination for a case in which a PDCCH is transmitted from multiple TRPs (i.e., MTRPs) and a PDSCH from a single TRP (i.e., a STRP) is scheduled by a corresponding PDCCH is described.

Unlike an example of a STRP PDCCH and a STRP PDSCH in FIG. 10(*a*), when a PDCCH is transmitted by MTRPs, ambiguity may occur in a default spatial parameter determination. For example, two TCI states may be configured for one CORESET for MTRP PDCCH transmission. In this case, a spatial parameter configured for a CORESET having a lowest ID in a latest slot may be two of a spatial parameter corresponding to a first TCI state and a spatial parameter corresponding to a second TCI state among the two TCI states.

FIG. 10(*b*) shows a case of MTRP PDCCH transmission that two TCI states are configured for a CORESET corresponding to a PDCCH. One TCI state may be configured/indicated for PDSCH reception of a terminal, so STRP PDSCH transmission and reception may be performed. For a shaded default spatial parameter duration, an unclear problem about which spatial parameter of two spatial parameters configured for a CORESET should be based to receive and buffer a downlink signal may occur to a terminal.

To resolve it, a base station and a terminal may make a pre-promise to determine one predetermined TCI state as a default spatial parameter among a plurality of TCI states configured for a CORESET having a lowest ID of a latest slot. For example, the one predetermined TCI state may be a first TCI state, a second TCI state or a last TCI state among the plurality of TCI states. Alternatively, one predetermined TCI state may be configured/indicated by a base station to a terminal through RRC signaling.

A maximum number of spatial parameters (or reception beams) which may be applied when a terminal receives downlink transmission may be reported in advance to a base station as UE capability information. For example, some terminal may have a capability to receive a downlink signal by applying up to one spatial parameter (e.g., through 1 reception beam) and other terminal may have a capability to receive a downlink signal by applying up to a plurality of spatial parameters (e.g., through 2 reception beams). In the present disclosure, the former is referred to as 1 Rx beam UE or 1 Rx default beam UE and the latter is referred to as 2 Rx beam UE or 2 Rx default beam UE.

In a default spatial parameter duration, an example in which one specific spatial parameter among a plurality of spatial parameters configured for a CORESET is determined as a default spatial parameter may be applied to 1 RX beam UE.

For 2 Rx beam UE, even when two TCI states are configured for a CORESET, without determining one TCI state of them as a default spatial parameter, a downlink signal may be received through two spatial parameters/beams corresponding to the two TCI states. Accordingly, 2 Rx beam UE may receive a downlink signal based on two default spatial parameters by using all of two TCI states configured for a CORESET having a lowest ID of a latest slot.

In FIG. 10(*b*), a case in which a STRP PDSCH is scheduled by a MTRP PDCCH is used as an example, but it is not limited, and the above-described example may be also applied to a case in which a MTRP PDSCH is scheduled by a MTRP PDCCH.

Embodiment 2

This embodiment is about an example which determines at least one default spatial parameter applied to downlink transmission and reception among a plurality of default spatial parameter candidates configured for a predetermined codepoint or a plurality of default spatial parameter candidates configured for a CORESET in a predetermined time duration (e.g., a default spatial parameter duration).

In reference to FIG. 10(*c*), a default spatial parameter determination for a case in which a PDCCH is transmitted from a single TRP (i.e., a STRP) and a PDSCH from multiple TRPs (i.e., MTRPs) is scheduled by a corresponding PDCCH is described. For example, a PDSCH scheduled through one DCI may be transmitted by a NCJT method from a plurality of TRPs. For it, a codepoint that a plurality of TCI states are configured may be included in at least one TCI codepoint configured for a terminal and a specific codepoint that a plurality of TCI states used for PDSCH reception are configured may be indicated by a TCI field in DCI.

In FIG. 10(*c*), in 5 slots (slot 0 to 4), an example that a PDSCH is scheduled through a PDCCH/DCI is shown. As one TRP transmits a PDCCH and a plurality of TRPs transmit a PDSCH, a terminal may be configured with one TCI state for receiving a PDCCH and a plurality of TCI states for receiving a PDSCH.

A TCI state for receiving a PDSCH may be determined based on a TCI state configured for a CORESET corresponding to a PDCCH/DCI scheduling a PDSCH, or may be determined based on a TCI state indicated by a TCI field in DCI scheduling a PDSCH. For the latter, for a default spatial parameter duration, a terminal may assume a STRP PDSCH only when each one TCI state is configured for all TCI codepoints (configured by a higher layer) and when even one TCI codepoint that a plurality of TCI states are configured among TCI codepoints (configured by a higher layer) is included, a terminal may assume a MTRP PDSCH (e.g., PDSCH NCJT transmission). Alternatively, a base station may configure a third factor which may indicate whether of a STRP PDSCH or a MTRP PDSCH to a terminal.

In FIG. 10(*c*), 1 Rx beam UE may determine a default spatial parameter based on one TCI state configured for a CORESET having a lowest ID of a latest slot that a CORESET is configured for a default spatial parameter duration.

In FIG. 10(*c*), 2 Rx beam UE may determine a default spatial parameter based on a plurality of TCI states configured for one specific codepoint (e.g., a codepoint having a lowest ID/index) among codepoint(s) that a plurality of TCI states are configured among preconfigured TCI codepoints for a default spatial parameter duration.

In this case, for a default spatial parameter duration, when other additional CORESET is configured/exists, there may be a limit that at least one TCI state among a plurality of TCI states configured for the one specific codepoint (e.g., a codepoint having a lowest ID/index) should be configured for the additional CORESET. In addition, when a plurality of TCI states are configured for the additional CORESET, there may be a limit that such a plurality of TCI states should be configured to be the same as a plurality of TCI states configured for the one specific codepoint (e.g., a codepoint having a lowest ID/index).

An example of the present disclosure for removing such a limit and applying a default spatial parameter more flexibly is described below.

FIG. 10(*d*) shows a case in which there is a CORESET that a plurality of spatial parameters (e.g., 2 TCI states) are configured (hereinafter, CORESET M) within a shaded region (e.g., a default spatial parameter duration). When at least one CORESET M exists in a default spatial parameter duration, a default spatial parameter may be determined (or updated) based on TCI states of CORESET M having a lowest ID of a latest slot among them.

An example of FIG. 10(*d*) is the same as an example of FIG. 10(*c*) except that CORESET M that 2 TCI states are configured additionally exists in slot 1. In other words, as described by referring to FIG. 10(*c*), a plurality of default spatial parameters may be determined based on a TCI codepoint after receiving a PDCCH in slot 0. Subsequently, when CORESET M that 2 TCI states are configured appears in slot 1, a default spatial parameter may be determined/updated based on 2 TCI states configured for corresponding CORESET M from a time when corresponding CORESET M is configured.

Accordingly, TCI state(s) configured for an additional CORESET which appears within a default spatial parameter duration may be configured differently from TCI state(s) configured for a TCI codepoint. A terminal may update a default spatial parameter based on TCI state(s) configured for an additional CORESET.

As an additional example, if a higher layer parameter enableTwoDefaultTCI-States is configured for a terminal (i.e., when it is configured to perform downlink reception through 2 Rx default beams for a terminal (it is distinguished from UE capability report)), when there is a SFN CORESET among CORESETs existing in a latest slot (i.e., a CORESET that 2 TCI states are configured), a terminal may determine a default spatial parameter for PDSCH reception/buffering based on 2 TCI states configured for a corresponding SFN CORESET.

As an additional example, when a CORESET having a lowest ID of a latest slot (among slot(s) that a CORESET exists) is a SFN CORESET (i.e., a CORESET that 2 TCI states are configured), a terminal may determine a default spatial parameter for PDSCH reception/buffering based on 2 TCI states configured for a corresponding SFN CORESET.

According to embodiment 2, a default spatial parameter may be determined differently according to whether a SFN CORESET exists among CORESET(s) of a latest slot or a default spatial parameter may be determined differently according to whether a CORESET having a lowest ID of a latest slot is a SFN CORESET.

Embodiment 3

This embodiment is about an additional example which determines at least one default spatial parameter applied to downlink transmission and reception among a plurality of default spatial parameter candidates configured for a predetermined codepoint or a plurality of default spatial parameter candidates configured for a CORESET in a predetermined time duration (e.g., a default spatial parameter duration).

According to the above-described embodiment 1 and 2, when a plurality of TCI states are configured for a CORESET having a lowest ID of a latest slot for a default spatial parameter duration, 2 Rx beam UE may determine a default spatial parameter based on a plurality of corresponding TCI states.

In reference to FIG. 10(*e*), a default spatial parameter determination for a case in which a PDCCH is transmitted from multiple TRPs (i.e., MTRPs) and a PDSCH from multiple TRPs (i.e., MTRPs) is scheduled by a corresponding PDCCH is described.

In FIG. 10(*e*), in 5 slots (slot 0 to 4), an example that a PDSCH is scheduled through a PDCCH/DCI is shown. As a plurality of TRPs transmit a PDCCH and a plurality of TRPs transmit a PDSCH, a terminal may be configured with a plurality of TCI states for receiving a PDCCH and a plurality of TCI states for receiving a PDSCH.

In FIG. 10(*e*), 2 Rx beam UE may determine a default spatial parameter based on a plurality of TCI states configured for a CORESET having a lowest ID of a latest slot that a CORESET is configured for a default spatial parameter duration.

In this case, for a default spatial parameter duration, when other additional CORESET is configured/exists, an unclear problem about whether a default spatial parameter will be determined/updated based on the additional CORESET may occur to a terminal. If an additional CORESET is CORESET M (i.e., a CORESET that a plurality of TCI states are configured), a default spatial parameter may be updated based on a plurality of TCI states configured for additional CORESET M. If an additional CORESET is CORESET S (i.e., a CORESET that one TCI state is configured), whether a default spatial parameter determined based on a plurality of TCI states will be updated based on one TCI state of the additional CORESET S or if so, what will be updated may become unclear.

An example of the present disclosure for resolving such ambiguity is described below.

FIG. 10(*f*) shows a case in which there is a CORESET that one spatial parameter (e.g., 1 TCI state) is configured (i.e., CORESET S) within a shaded region (e.g., a default spatial parameter duration).

Embodiment 3-1

In an example of FIG. 10(*f*), CORESET S may be defined not to be used for updating a default spatial parameter in a default spatial parameter duration.

If at least one CORESET M exists in a default spatial parameter duration, a default spatial parameter may be updated based on a spatial parameter of a CORESET having a lowest ID among at least one CORESET M in a latest slot where a corresponding CORESET exists.

Embodiment 3-2

In an example of FIG. 10(*f*), when CORESET S is or may be a CORESET used for MTRP PDSCH scheduling (e.g., when at least one codepoint that a plurality of TCI states are configured is included in at least one preconfigured TCI codepoint), a terminal may update a default spatial parameter based on a plurality of TCI states configured for a codepoint having a lowest ID/index among codepoints that a plurality of TCI states are configured from a time after CORESET S reception within a default spatial parameter duration of FIG. 10(*f*).

In embodiment 3-1, since CORESET S that 1 TCI state is configured is ignored for default spatial parameter determination/update and a default spatial parameter is determined, a spatial parameter configured for CORESET S may be limited to one of a plurality of default spatial parameters configured for a CORESET associated with a MTRP PDCCH of slot 0. To improve a scheduling freedom degree by removing such a limit and applying a TCI state configuration for a CORESET more flexibly, a default spatial parameter may be determined/updated based on a TCI codepoint as in embodiment 3-2.

In an example of FIG. 10(*f*), when CORESET S is a CORESET used for STRP PDSCH scheduling (e.g., when a codepoint that a plurality of TCI states are configured is not included in at least one preconfigured TCI codepoint), CORESET S may be defined not to be used for updating a default spatial parameter in a default spatial parameter duration.

As an additional example, if a higher layer parameter enableTwoDefaultTCI-States is configured for a terminal (i.e., when it is configured to perform downlink reception through 2 Rx default beams for a terminal (it is distinguished from UE capability report)), when there is no SFN CORESET among CORESETs existing in a latest slot (i.e., a CORESET that 2 TCI states are configured), a terminal may determine a default spatial parameter for PDSCH reception/buffering based on 2 TCI states configured for a lowest TCI codepoint among TCI codepoint(s) that 2 TCI states are configured.

As an additional example, if a higher layer parameter enableTwoDefaultTCI-States is configured for a terminal (i.e., when it is configured to perform downlink reception through 2 Rx default beams for a terminal (it is distinguished from UE capability report)), when a CORESET having a lowest ID of a latest slot is not a SFN CORESET (i.e., a CORESET that 2 TCI states are configured), a terminal may determine a default spatial parameter for PDSCH reception/buffering based on 2 TCI states configured for a lowest TCI codepoint among TCI codepoint(s) that 2 TCI states are configured.

According to embodiment 3-2, a default spatial parameter may be determined differently according to whether a SFN CORESET exists among CORESET(s) of a latest slot or a default spatial parameter may be determined differently according to whether a CORESET having a lowest ID of a latest slot is a SFN CORESET.

Embodiment 3-3

In an example of FIG. 10(*f*), when CORESET S is a CORESET used for STRP PDSCH scheduling (e.g., when a codepoint that a plurality of TCI states are configured is not included in at least one preconfigured TCI codepoint), based on 1 TCI state configured for CORESET S, part of a default spatial parameter may be updated.

In an example of FIG. 10(*f*), 2 default spatial parameters may be determined based on 2 TCI states configured for MTRP PDCCH reception of slot 0 and after CORESET S appears, one of the 2 default spatial parameters may be updated based on 1 TCI state configured for CORESET S.

For example, a default spatial parameter is determined as TCI state 0 and 1 before CORESET S that TCI state 2 is configured appears in slot 1, and if CORESET S appears, a first default spatial parameter may be maintained as TCI state 0 (i.e., corresponding to a first TCI state of two) and a second default spatial parameter may be updated from TCI state 1 (corresponding to a second TCI state of two) to TCI state 2 of CORESET S.

In embodiment 3-2, a default spatial parameter is maintained by ignoring a TCI state configured for CORESET S for default spatial parameter determination/update and determining a default spatial parameter, and as a result, a spatial parameter configured for CORESET S may be limited to one of a plurality of spatial parameters configured for a CORESET associated with a MTRP PDCCH. To improve a scheduling freedom degree by removing such a limit and applying a TCI state configuration for a CORESET more flexibly, part of a default spatial parameter may be updated based on a spatial parameter configured for CORESET S as in embodiment 3-3.

In FIG. 10(*e*) and FIG. 10(*f*), a case in which a MTRP PDSCH is scheduled by a MTRP PDCCH is used as an example, but it is not limited, and the above-described example may be also applied to a case in which a STRP PDSCH is scheduled by a MTRP PDCCH.

Embodiment 4

In the above-described examples, a method of determining a default spatial parameter may be applied differently according to the number of spatial parameters configured for a CORESET associated with a PDCCH and/or whether a PDSCH scheduled by a corresponding PDCCH is a MTRP PDSCH or a STRP PDSCH (or whether a codepoint that a plurality of TCI states are configured is included in a TCI codepoint).

Such an operation may increase implementation complexity of a base station and a terminal, so a base station may directly indicate a default spatial parameter to a terminal in order not to increase implementation complexity.

For example, a base station may configure/indicate to a terminal a TCI state (or a QCL reference RS) used to determine a default spatial parameter, and regardless of the number of TCI states configured for a CORESET and/or whether of a MTRP/STRP PDSCH, a terminal may determine/update a default spatial parameter with the configured/indicated TCI state (or QCL reference RS).

Such a default spatial parameter configuration/indication may be provided for a terminal through (new) RRC signaling, or may be provided for a terminal through MAC-CE signaling along with RRC signaling for more dynamic (or faster) default spatial parameter change/update. For example, at least one default spatial parameter candidate may be configured/indicated to a terminal through RRC signaling and one of the candidates may be configured/indicated to a terminal through MAC-CE signaling.

As such, when a default spatial parameter is explicitly/directly indicated to a terminal, a terminal no longer follows a method of determining/updating a default spatial parameter based on TCI state(s) configured for a TCI codepoint or based on TCI state(s) configured for a CORESET having a lowest ID of a latest slot and may determine/update a default spatial parameter based on a value which is explicitly/directly indicated. If a default spatial parameter is not explicitly/directly indicated, a default spatial parameter may be determined according to the above-described embodiment 1 to 3.

In examples of the above-described embodiment 1 to 4, both single DCI based NCJT and multiple DCI based NCJT may be applied as a MTRP PDSCH transmission method. In other words, in the above-described examples, single DCI based NCJT was illustratively described, but it is not limited, and the above-described examples may be also applied to multiple DCI based NCJT (e.g., when a plurality of CORESET pool indexes are configured) (each CORESET pool index may correspond to one TRP). For example, in multiple DCI based NCJT, 2 Rx (default) beam UE may determine/update a default spatial parameter based on a spatial parameter configured for a CORESET having a lowest ID of a latest slot per CORESET pool. In this case, when a plurality of spatial parameters are configured for a CORESET having a a lowest ID of a latest slot in each CORESET pool, one spatial parameter of them (e.g., a first TCI state) may be determined as a default spatial parameter according to the above-described examples.

As an additional example, a case may be assumed in which a plurality of spatial parameters are configured for a CORESET having a lowest ID of a latest slot and a corresponding CORESET belongs to both CORESET pool index 0 and 1. In this case, a first spatial parameter among the plurality of spatial parameters may be determined as a default spatial parameter for CORESET pool index 0 and a second spatial parameter may be promised/defined in advance to be determined as a default spatial parameter for CORESET pool index 0. A case in which a plurality of spatial parameters are configured for a CORESET may correspond to a case in which multiple TRPs cooperatively transmit a PDCCH of a corresponding CORESET, so a corresponding CORESET may not only belong to CORESET pool index 0, a CORESET pool used by TRP 0, but also belong to CORESET pool index 1, a CORESET pool used by TRP 1.

For example, when an index of a pool of a CORESET that a PDCCH scheduling a PDSCH is transmitted is considered as i (i=0 or 1), a default spatial parameter for PDSCH reception/buffering may be determined for a CORESET belonging to pool index i. If CORESET A that two TCI states are configured belongs to both CORESET pool index 0 and 1, a default spatial parameter may be determined based on TCI states configured for CORESET A. Here, based on some TCI state of TCI states configured for CORESET A, a default spatial parameter may be determined based on pool index i. In other words,for i=0, a default spatial parameter may be determined by using a first TCI state of 2 TCI states and for i=1, a default spatial parameter may be determined by using a second TCI state of 2 TCI states. If a CORESET that a PDCCH scheduling a PDSCH may be transmitted is not only configured in pool index 0, but also configured in pool index 1, a first default spatial parameter may be configured from CORESETs belonging to pool index 0 for the PDSCH reception (e.g., based on a spatial parameter configured for a CORESET having a lowest ID of a latest slot among CORESETs belonging to pool index 0) and a second default spatial parameter may be configured from CORESETs belonging to pool 1 (e.g., based on a spatial parameter configured for a CORESET having a lowest ID of a latest slot among CORESETs belonging to pool index 0) to use two default spatial parameters.

In the above-described examples, a default spatial parameter related to a PDSCH scheduled by a PDCCH was mainly described, but it is not limited, and the above-described examples may be also applied to a default spatial parameter related to an aperiodic (AP) CSI-RS triggered by a PDCCH. For example, after PDCCH reception, for a beamSwitchTiming time duration which is pre-reported by a terminal, a terminal may receive a downlink signal based on a default spatial parameter.

If any downlink signal does not exist for the time duration, a terminal may determine a default spatial parameter for AP CSI-RS reception/buffering based on a spatial parameter configured for a CORESET having a lowest ID of a latest slot. In this case, when a plurality of TCI states are configured for a corresponding CORESET, a terminal may determine specific one of the plurality of TCI states as a default spatial parameter or may determine all of the plurality of TCI states as a default spatial parameter according to its capability (e.g., 1 RX beam UE or 2 RX beam UE).

When a downlink signal exists for the time duration, a terminal may determine a default spatial parameter for AP CSI-RS reception/buffering based on a spatial parameter which received a corresponding downlink signal. In this case, when a corresponding downlink signal is received through a plurality of spatial parameters, a terminal may determine specific one of the plurality of spatial parameters as a default spatial parameter or may determine all of the plurality of spatial parameters as a default spatial parameter according to its capability (e.g., 1 RX beam UE or 2 RX beam UE).

For the time duration, when a TCI codepoint that a plurality of spatial parameters are configured is included among at least one TCI codepoint which is preconfigured for a terminal, a default spatial parameter for AP CSI-RS reception/buffering may be determined based on a plurality of spatial parameters configured for a corresponding TCI codepoint.

For the time duration, when a TCI codepoint that a plurality of spatial parameters are configured is not included among at least one TCI codepoint which is preconfigured for a terminal, a default spatial parameter for AP CSI-RS reception/buffering may be determined based on a plurality of spatial parameters configured for a CORESET associated with a PDCCH triggering an AP CSI-RS.

When an additional CORESET appears for the time duration, when a plurality of spatial parameters are configured for an additional CORESET, a default spatial parameter for AP CSI-RS reception/buffering may be determined/updated based on a plurality of spatial parameters configured for the additional CORESET.

When an additional CORESET appears for the time duration, when a CORESET that a plurality of spatial parameters are configured is not included in an additional CORESET, a default spatial parameter for AP CSI-RS reception/buffering may be determined based on a plurality of spatial parameters configured for a TCI codepoint.

For the time duration, a terminal may receive an AP CSI-RS based on a spatial parameter (e.g., a TCI state or a QCL type D RS) of a CORESET having a lowest ID of a latest slot among CORESETs of a CORESET pool to which DCI triggering an AP CSI-RS belongs. In this case, if a CORESET belongs to both CORESET pool 0 and 1, a first spatial parameter may be used as a default spatial parameter of CORESET pool 0 and a second spatial parameter may be promised/defined to be used as a default spatial parameter of CORESET pool 1.

In the above-described examples, it was described by assuming a case of 2 spatial parameters as an example of a plurality of spatial parameters for receiving a PDCCH/a PDSCH, but a scope of the present disclosure is not limited thereto, and it may also include a case of at least three spatial parameters.

In the above-described examples, a case in which a plurality of TCI states are configured for one CORESET may be replaced with a case in which a plurality of CORESETs that one TCI state is configured are configured to repetitively/partitively transmit the same DCI. For example, CORESET 1 that one TCI state is configured and CORESET 2 that one TCI state is configured may be configured for a terminal, and corresponding CORESET 1 and 2 may be multiplexed (e.g., FDM) in slot 0 and used to transmit the same DCI repetitively/partitively. In this case, a terminal may determine 2 default spatial parameters based on a spatial parameter configured for CORESET 1 (e.g., a TCI state or a beam) and a spatial parameter configured for CORESET 2 (e.g., a TCI state or a beam) for a default spatial parameter duration.

Figure 11:
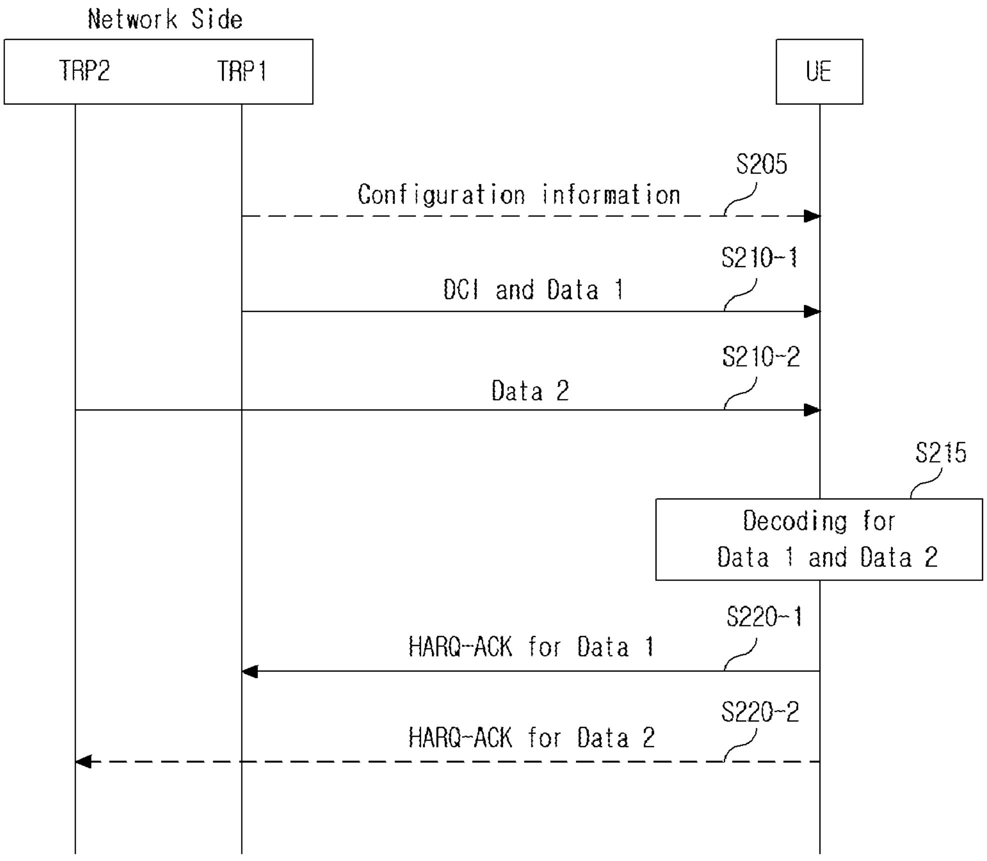
FIG. 11 is a diagram which represents an example on signaling between a network side and a terminal to which embodiments of the present disclosure may be applied.

FIG. 11 is a diagram which represents an example on signaling between a network side and a terminal to which embodiments of the present disclosure may be applied.

Figure 12:
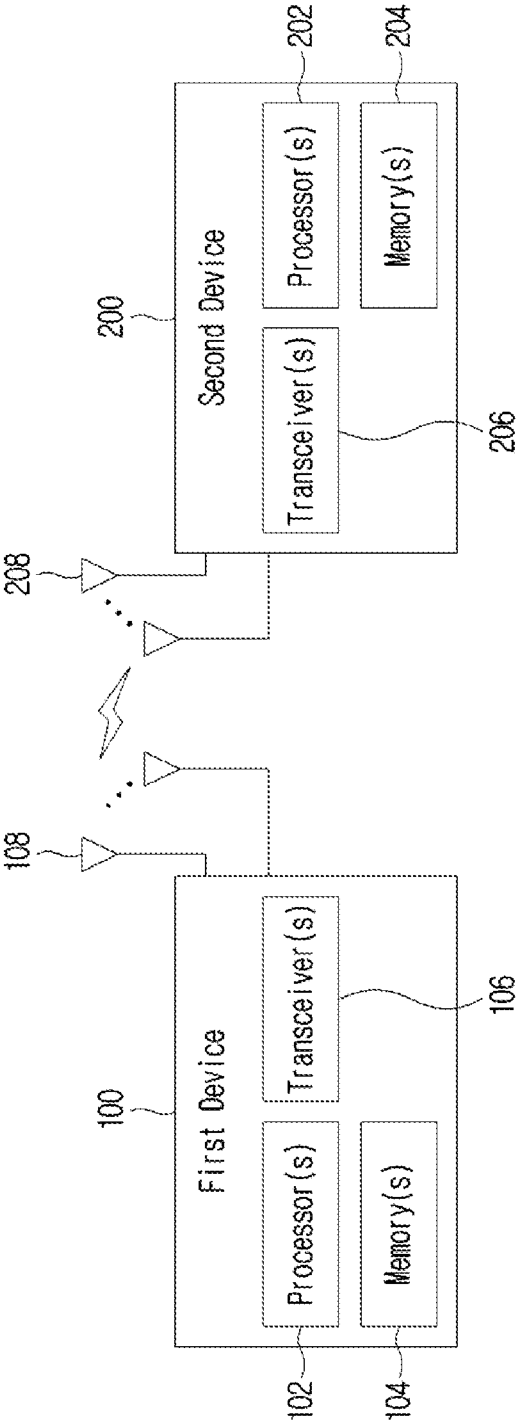
FIG. 12 illustrates a block diagram of a wireless communication system according to an embodiment of the present disclosure.

FIG. 11 represents signaling between a network side (e.g., TRP 1, TRP 2) and a terminal (UE) in a situation of multi-TRPs (or multi-cells, hereinafter, all TRPs may be replaced with a cell) to which an example or a combination of examples of the present disclosure may be applied. Here, UE/a network side is just an example, and may be applied by being substituted with a variety of devices as illustrated in FIG. 12. FIG. 11 is just for convenience of a description, and it does not limit a scope of the present disclosure. In addition, some step(s) shown in FIG. 11 may be omitted according to a situation and/or a configuration, etc.

In reference to FIG. 11, for convenience of a description, signaling between 2 TRPs and UE is considered, but it goes without saying that a corresponding signaling method may be extended and applied to signaling between multiple TRPs and multiple UE. In the following description, a network side may be one base station including a plurality of TRPs or may be one cell including a plurality of TRPs. In an example, an ideal/non-ideal backhaul may be configured between TRP 1 and TRP 2 configuring a network side. In addition, the following description is described based on multiple TRPs, but it may be equally extended and applied to transmission through multiple panels. In addition, in the present disclosure, an operation that a terminal receives a signal from TRP1/TRP2 may be interpreted/described (or may be an operation) as an operation that a terminal receives a signal from a network side (through/with TRP1/2) and an operation that a terminal transmits a signal to TRP1/TRP2 may be interpreted/described (or may be an operation) as an operation that a terminal transmits a signal to a network side (through/with TRP1/TRP2) or may be inversely interpreted/described.

In addition, as described above, "a TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., an index, an ID). In an example, when one terminal is configured to perform transmission and reception with multiple TRPs (or cells), it may mean that multiple CORESET groups (or CORESET pools) are configured for one terminal. Such a configuration on a CORESET group (or a CORESET pool) may be performed through higher layer signaling (e.g., RRC signaling, etc.). In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may also include a panel, a transmission and reception unit, etc. of a base station.

Specifically, FIG. 11 represents signaling for a case when a terminal receives single DCI (i.e., when one TRP transmits DCI to UE) in a situation of M-TRPs (or, M-cells, hereinafter, all TRPs may be replaced with a cell, or even when a plurality of CORESETs are configured from one TRP, it may be assumed as M-TRPs). FIG. 11 assumes a case in which TRP 1 is a representative TRP which transmits DCI.

It is not shown in FIG. 11, but UE may transmit capability information to a network side through/with TRP 1 (and/or TRP 2). For example, the capability information may include information representing whether UE supports an operation according to examples of the present disclosure.

UE may receive configuration information on multiple TRP based transmission and reception through/with TRP 1 (and/or TRP 2) from a Network side S205. The configuration information may include information related to a configuration of a network side (i.e., a TRP configuration), resource information (resource allocation) related to multiple TRP based transmission and reception, etc. In this case, the configuration information may be transmitted through higher layer signaling (e.g., RRC signaling, MAC-CE, etc.). In addition, when the configuration information is predefined or preconfigured, a corresponding step may be omitted. For example, the configuration information may include a CORESET-related configuration/CCE configuration information/search space-related information/information related to repeat transmission of a control channel (e.g., a PDCCH) (e.g., whether repeat transmission is performed/the number of times of repeat transmission, etc.) as described in examples of the present disclosure.

For example, the above-described operation that UE in S205 (100/200 in FIG. 12) receives configuration information related to the multiple TRP-based transmission and reception from a network side (200/100 in FIG. 12) may be implemented by a device in FIG. 12 which will be described below. For example, in reference to FIG. 12, at least one processor 102 may control at least one transceiver 106 and/or at least one memory 104, etc. to receive configuration information related to the multiple TRP-based transmission and reception and at least one transceiver 106 may receive configuration information related to the multiple TRP-based transmission and reception from a network side.

UE may receive DCI and Data 1 scheduled by corresponding DCI through/with TRP 1 from a network side S210-1. In addition, UE may receive Data 2 through/with TRP 2 from a network wide S210-2. Here, DCI may be configured to be used for scheduling for both Data 1 and Data 2.

For example, the DCI may include (indication) information on a TCI state/resource allocation information on a DMRS and/or data (i.e., a space/frequency/time resource)/information related to repeat transmission, etc. described in examples of the present disclosure. For example, the information related to repetition transmission may include whether DCI is repetitively transmitted/the number of repetitions/whether one-time transmission is performed, etc. For example, a codepoint of a TCI field in the DCI may be differently defined respectively for a case when the DCI is repetitively/partitively transmitted through a plurality of TRPs and a case when it is transmitted through a single TRP. In other words, UE may differently apply/interpret a TCI state composition/configuration according to whether of a STRP/MTRPs for a specific codepoint. In addition, DCI and Data (e.g., Data 1, Data 2) may be transmitted through a control channel (e.g., a PDCCH, etc.) and a data channel (e.g., a PDSCH, etc.), respectively. In addition, Step S210-1 and Step S210-2 may be performed simultaneously or any one may be performed earlier than the other.

For example, TRP1 and/or TRP2 may repetitively/partitively transmit the same DCI. In one example, a PDCCH candidate for each TRP that the DCI is transmitted may correspond to a different TCI state. In other words, a control channel (e.g., a PDCCH) that DCI is transmitted may be repetitively transmitted based on a TDM/FDM/SDM method or the same control channel may be partitively transmitted. For example, a DCI format which may be transmitted per each TRP may be equally configured or differently configured, respectively. For example, HARQ-ACK (e.g., ACKNACK) related indicators (e.g., C-DAI, T-DAI, PRI, CCE index) may be determined based on a reception time of the DCI.

For example, a terminal may receive/buffer data based on a default spatial parameter for a predetermined time duration after receiving DCI. A predetermined time duration may correspond to a time duration when an offset between a time when a terminal receives DCI and a time when a terminal receives data is equal to or less than a value of a predetermined parameter (e.g., timeDurationForQCL, beamSwitchTiming, etc.). A default spatial parameter, as described in the above-described examples, may be determined based on at least one of a spatial parameter configured for at least one codepoint which is preconfigured for a terminal (e.g., a TCI codepoint), or a spatial parameter configured for at least one CORESET including a CORESET that DCI is received.

For example, the above-described operation that UE (100/200 in FIG. 12) in S210-1/S210-2 receives the DCI 1 and/or the DCI 2 and/or the Data 1 and/or the Data 2 from a network side (200/100 in FIG. 12) may be implemented by a device in FIG. 12 which will be described below. For example, in reference to FIG. 12, at least one processor 102 may control at least one transceiver 106 and/or at least one memory 104, etc. to receive the DCI 1 and/or the DCI 2 and/or the Data 1 and/or the Data 2 and at least one transceiver 106 may receive the DCI 1 and/or the DCI 2 and/or the Data 1 and/or the Data 2 from a network side.

UE may decode received Data 1 and Data 2 through/with TRP 1 (and/or TRP 2) from a network side S215. For example, UE may perform channel estimation and/or blind detection and/or data decoding based on examples of the present disclosure.

For example, the above-described operation that UE in step S215 (100/200 of FIG. 12) decodes the Data 1 and Data 2 may be implemented by a device in FIG. 12 which will be described below. For example, in reference to FIG. 12, at least one processor 102 may control at least one memory 104, etc. to perform an operation of decoding the Data 1 and Data 2.

UE may transmit HARQ-ACK information on the DCI and/or the Data 1 and/or Data 2 (e.g., ACK information, NACK information, etc.) to a network side through/with TRP 1 and/or TRP 2 S220-1, S220-2. In this case, HARQ-ACK information on Data 1 and Data 2 may be combined into one. In addition, UE may be configured to transmit only HARQ-ACK information to a representative TRP (e.g., TRP 1) and HARQ-ACK information transmission to other TRP (e.g., TRP 2) may be omitted.

For example, HARQ-ACK information (e.g., ACK information, NACK information, etc.) on DCI (or a PDCCH that DCI is transmitted) may be transmitted to a network side through/with TRP 1 and/or TRP 2 based on examples of the present disclosure. For example, a parameter (e.g., a C-DAI, a T-DAI, a PRI, a CCE index) related to the HARQ-ACK information (e.g., a ACK/NACK codebook) may be determined according to a DCI reception time based on examples of the present disclosure. For example, when receiving a plurality of DCI including DCI which is repetitively transmitted, reception order of the plurality of DCI may be determined based on a reception time (e.g., a MO) of first DCI of DCI which is repetitively transmitted. A parameter (e.g., a C-DAI, a T-DAI, a PRI, a CCE index) related to the HARQ-ACK information (e.g., a ACK/NACK codebook) may be determined based on determined DCI reception order.

For example, the above-described operation that UE in S220-1/S220-2 (100/200 of FIG. 12) transmits HARQ-ACK information on the Data 1 and/or Data 2 from a network side (100/200 of FIG. 12) may be implemented by a device in FIG. 12 which will be described below. For example, in reference to FIG. 12, at least one processor 102 may control at least one transceiver 106 and/or at least one memory 104, etc. to transmit HARQ-ACK information on the Data 1 and/or Data 2 and at least one transceiver 106 may transmit HARQ-ACK information on the Data 1 and/or Data 2 to a network side.

An example of FIG. 11 represents a single DCI based transmission and reception procedure in a MTRP situation, but a description related to FIG. 11 may be also applied similarly to a multiple DCI based transmission and reception procedure from TRP 1 and TRP 2.

As described above, the above-described network side/UE signaling and operation may be implemented by a device which will be described below (e.g., a device in FIG. 12). For example, a network side (e.g., TRP 1/TRP 2) may correspond to a first wireless device and UE may correspond to a second wireless device and in some cases, the opposite may be considered.

For example, the above-described network side/UE signaling and operation may be processed by at least one processor (e.g., 102, 202) and the above-described network side/UE signaling and operation may be stored in a memory (e.g., at least one memory in FIG. 12 (e.g., 104, 204)) in a form of a command/a program (e.g., an instruction, an executable code) for driving at least one processor in FIG. 12 (e.g., 102, 202).

General Device to which the Present Disclosure may be Applied

FIG. 12 is a diagram which illustrates a block diagram of a wireless communication system according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices,flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:

receiving, by a terminal from a base station, at least one of first configuration information related to at least one transmission configuration indicator (TCI) state configured for at least one TCI codepoint or second configuration information related to at least one TCI state configured for at least one control resource set (CORESET);

receiving, by the terminal from the base station, in a first time unit, downlink control information (DCI); and receiving, by the terminal from the base station, in a second time unit, a downlink transmission based on a default TCI state, wherein, based on there being no TCI codepoint configured with a plurality of TCI states in an activation command through a medium access control (MAC) control element (CE), and the downlink transmission being a physical downlink shared channel (PDSCH) transmission:

the default TCI state is determined based on a first TCI state of a plurality of TCI states indicated for a specific CORESET.

2. The method according to claim 1, wherein:

the specific CORESET is a CORESET having a lowest CORESET identifier in a latest time unit.

3. The method according to claim 1, wherein:

an offset between the first time unit and the second time unit is less than a predetermined time threshold.

4. The method according to claim 3, wherein:

based on the downlink transmission being the PDSCH transmission, the predetermined time threshold is a timeDurationForQCL parameter.

5. The method according to claim 1, wherein:

the terminal is configured to perform or has a capability of performing a reception of the DCI through a physical downlink control channel (PDCCH) based on a plurality of TCI states in a single time unit.

6. The method according to claim 1, wherein:

the TCI state includes parameters for configuring a quasi co-location (QCL) relationship between at least one downlink reference signal (RS) and at least one demodulation reference signal port of the PDSCH or at least one CSI-RS port.

7. The method according to claim 1, wherein:

each of the first time unit and the second time unit is a slot or a symbol defined based on a subcarrier spacing.

8. A terminal comprising:

at least one transceiver; and at least one processor connected to the at least one transceiver, wherein the at least one processor is configured to:

receive, from a base station through the at least one transceiver, at least one of first configuration information related to at least one transmission configuration indicator (TCI) state configured for at least one TCI codepoint or second configuration information related to at least one TCI state configured for at least one control resource set (CORESET);

receive, from the base station through the at least one transceiver, in a first time unit, downlink control information (DCI); and receive, from the base station through the at least one transceiver, in a second time unit, a downlink transmission based on a default TCI state, wherein, based on there being no TCI codepoint configured with a plurality of TCI states in an activation command through a medium access control (MAC) control element (CE), and the downlink transmission being a physical downlink shared channel (PDSCH) transmission:

the default TCI state is determined based on a first TCI state of a plurality of TCI states indicated for a specific CORESET.

9. A base station comprising:

at least one transceiver; and at least one processor connected to the at least one transceiver, wherein the at least one processor is configured to:

transmit, to a terminal through the at least one transceiver, at least one of first configuration information related to at least one transmission configuration indicator (TCI) state configured for at least one TCI codepoint or second configuration information related to at least one TCI state configured for at least one control resource set (CORESET);

transmit, to the terminal through the at least one transceiver, in a first time unit, downlink control information (DCI); and transmit, to the terminal through the at least one transceiver, in a second time unit, a downlink transmission based on a default TCI state, wherein, based on there being no TCI codepoint configured with a plurality of TCI states in an activation command through a medium access control (MAC) control element (CE), and the downlink transmission being a physical downlink shared channel (PDSCH) transmission:

the default TCI state is determined based on a first TCI state of a plurality of TCI states indicated for a specific CORESET.

* * * * *